US010564317B2

(12) United States Patent
Brewer et al.

(10) Patent No.: US 10,564,317 B2
(45) Date of Patent: Feb. 18, 2020

(54) RESERVOIR MESH CREATION USING EXTENDED ANISOTROPIC, GEOMETRY-ADAPTIVE REFINEMENT OF POLYHEDRA

(71) Applicant: Halliburton Energy Services, Inc., Houston, TX (US)

(72) Inventors: Michael Loyd Brewer, Katy, TX (US); Steven Bryan Ward, Austin, TX (US); Gerrick Bivins, Fulshear, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 359 days.

(21) Appl. No.: 15/517,006

(22) PCT Filed: Nov. 12, 2014

(86) PCT No.: PCT/US2014/065177
§ 371 (c)(1),
(2) Date: Apr. 5, 2017

(87) PCT Pub. No.: WO2016/076847
PCT Pub. Date: May 19, 2016

(65) Prior Publication Data
US 2017/0299770 A1 Oct. 19, 2017

(51) Int. Cl.
*G01V 99/00* (2009.01)
(52) U.S. Cl.
CPC .................... *G01V 99/005* (2013.01)
(58) Field of Classification Search
CPC .................................................. G01V 99/005

(Continued)

(56) References Cited

U.S. PATENT DOCUMENTS 5,740,342 A * 4/1998 Kocberber ............. G06T 17/05
345/420
8,494,827 B2 * 7/2013 Mutlu ................. G06F 17/5018
703/10

(Continued)

FOREIGN PATENT DOCUMENTS

| EP | 1107187 | 6/2001 |
|---|---|---|
| WO | 2015002645 | 1/2015 |
| WO | 2016007169 | 1/2016 |

OTHER PUBLICATIONS

Ivar Aavatsmark ("Multipoint flux approximation methods for quadrilateral grids", 9th International Forum on Reservoir Simulation, 2007, pp. 1-44) (Year: 2007).*

(Continued)

*Primary Examiner* — Kamini S Shah
*Assistant Examiner* — Iftekhar A Khan
(74) *Attorney, Agent, or Firm* — Kilpatrick Townsend & Stockton LLP

(57) ABSTRACT

One example herein involves a method that includes identifying, based on a received reservoir specification: a set fractures including 2.5 dimensional (2.5D)-permitting fractures; and other fractures. The method further includes generating an intermediate reservoir model including an extrusion mesh which models the 2.5D-permitting fractures in a three-dimensional (3D) space. In response to determining that cells in the mesh should be refined in a direction within the 3D space, the method anisotropically refines cells in the mesh corresponding to the other fractures. The method also includes resolving a fracture network within the intermediate reservoir model using the refined cells and then generating a reservoir earth model using the fracture network.

19 Claims, 25 Drawing Sheets

(58) Field of Classification Search
USPC .......................................................... 703/10
See application file for complete search history.

(56) References Cited

U.S. PATENT DOCUMENTS

| | | | | |
|---|---|---|---|---|
| 8,532,969 B2* | 9/2013 | Li | ...................... | G06F 17/5018 |
| | | | | 703/10 |
| 8,727,017 B2* | 5/2014 | Hilliard | ................... | G06T 19/00 |
| | | | | 166/250.01 |
| 8,935,141 B2* | 1/2015 | Ran | ........................ | G06T 17/20 |
| | | | | 345/419 |
| 9,026,416 B2* | 5/2015 | Mallison | ................. | E21B 43/00 |
| | | | | 703/10 |
| 9,058,445 B2* | 6/2015 | Usadi | ................. | G06F 17/5009 |
| 9,068,448 B2* | 6/2015 | Hui | ........................ | E21B 43/00 |
| 9,489,176 B2* | 11/2016 | Haugen | ................... | G06F 17/16 |
| 2001/0006387 A1* | 7/2001 | Bennis | .................... | G06T 17/20 |
| | | | | 345/418 |
| 2002/0032494 A1* | 3/2002 | Kennon | ................. | G01V 11/00 |
| | | | | 700/98 |
| 2002/0038201 A1* | 3/2002 | Balaven | ............... | G01V 99/005 |
| | | | | 703/2 |
| 2002/0082813 A1* | 6/2002 | Lim | ....................... | G01V 11/00 |
| | | | | 703/2 |
| 2003/0132934 A1* | 7/2003 | Fremming | ............... | G01V 1/30 |
| | | | | 345/419 |
| 2005/0273303 A1* | 12/2005 | Flandrin | ................. | G06T 17/20 |
| | | | | 703/10 |
| 2006/0025976 A1* | 2/2006 | Kennon | .............. | G06F 17/5018 |
| | | | | 703/10 |
| 2006/0085174 A1* | 4/2006 | Hemanthkumar | ..... | G06Q 50/06 |
| | | | | 703/10 |
| 2007/0073527 A1* | 3/2007 | Flandrin | ................. | G06T 17/20 |
| | | | | 703/10 |
| 2008/0091396 A1* | 4/2008 | Kennon | ................. | E21B 43/26 |
| | | | | 703/10 |
| 2009/0248374 A1* | 10/2009 | Huang | ................... | E21B 43/00 |
| | | | | 703/2 |
| 2010/0076738 A1* | 3/2010 | Dean | ...................... | E21B 43/26 |
| | | | | 703/7 |
| 2010/0138202 A1* | 6/2010 | Mallison | ................. | E21B 43/00 |
| | | | | 703/10 |
| 2011/0259599 A1* | 10/2011 | Walker | ................... | H04N 13/275 |
| | | | | 166/369 |
| 2011/0313745 A1* | 12/2011 | Mezghani | .............. | G01V 99/00 |
| | | | | 703/10 |
| 2012/0191432 A1* | 7/2012 | Khataniar | ............... | E21B 43/00 |
| | | | | 703/10 |
| 2012/0215513 A1* | 8/2012 | Branets | ................ | G01V 99/005 |
| | | | | 703/10 |
| 2012/0267104 A1* | 10/2012 | Clarkson | ............... | E21B 43/267 |
| | | | | 166/280.1 |
| 2012/0310613 A1* | 12/2012 | Moos | ...................... | E21B 43/26 |
| | | | | 703/10 |
| 2013/0073272 A1* | 3/2013 | Wallace | .................. | E21B 43/00 |
| | | | | 703/10 |
| 2013/0218539 A1* | 8/2013 | Souche | ............... | G06F 17/5009 |
| | | | | 703/2 |
| 2014/0046636 A1* | 2/2014 | Mustapha | ........... | G06F 17/5018 |
| | | | | 703/2 |
| 2014/0136171 A1* | 5/2014 | Sword, Jr. | .............. | G01V 11/00 |
| | | | | 703/10 |
| 2014/0216730 A1* | 8/2014 | Ersoz | ....................... | G01V 1/42 |
| | | | | 166/250.1 |
| 2014/0236559 A1* | 8/2014 | Fung | ........................ | E21B 41/00 |
| | | | | 703/10 |
| 2016/0103246 A1* | 4/2016 | Freeman | .............. | G01V 99/005 |
| | | | | 703/10 |
| 2016/0116635 A1* | 4/2016 | Ward | .................... | G01V 99/005 |
| | | | | 703/2 |
| 2016/0170085 A1* | 6/2016 | Ward | ................... | G06F 17/5018 |
| | | | | 703/2 |
| 2017/0199303 A1* | 7/2017 | Brewer | ................... | G01V 99/00 |
| 2018/0306015 A1* | 10/2018 | Shetty | ..................... | E21B 43/26 |

OTHER PUBLICATIONS

Kenji Shimada ("Current Trends and Issues in Automatic Mesh Generation", Computer-Aided Design & Applications, vol. 3, Nos. 1-4, 2006, pp. 1-10) (Year: 2006).*

Ivar Aavatsmark ("Multipoint flux approximation methods for quadrilateral grids", 9th International Forum on Reservoir Simulation, Abu Dhabi, Dec. 9-13, 2007, pp. 1-44) (Year: 2007).*

French Application No. 1559673, Search Report and Written Opinion dated Jan. 26, 2018, 9 pages (2 pages of English translation and 7 pages of original documents).

Jones et al., "Integration of regional to outcrop digital data: 3D visualisation of multi-scale geological models", Computers & Geosciences, vol. 35, Issue 1, Jan. 2009, pp. 4-18.

Oaks et al., "(Abstract) Polyhedral Mesh Generation", Proceedings, 9th International Meshing Roundtable, Sandia National Laboratories, Oct. 2000, pp. 57-67.

PCT/US2014/065177, "International Search Report and Written Opinion", dated Jul. 28, 2015, 7 pages.

Sjodahl et al., "2.5D resistivity modeling of embankment dams to assess influence from geometry and material properties", Geophysics, vol. 71, No. 3, May-Jun. 2006, pp. G107-G114.

* cited by examiner

RESERVOIR MESH CREATION USING EXTENDED ANISOTROPIC, GEOMETRY-ADAPTIVE REFINEMENT OF POLYHEDRA

CROSS-REFERENCE TO RELATED APPLICATIONS

This is a U.S. national phase under 35 U.S.C. 371 of International Patent Application No. PCT/US2014/065177 titled "Reservoir Mesh Creation Using Extended Anisotropic, Geometry-Adaptive Refinement of Polyhedra" and filed Nov. 12, 2014, the entirety of which is incorporated herein by reference.

TECHNICAL FIELD

The present disclosure relates generally to hydrocarbon reservoir modeling and, more specifically, to techniques for creating reservoir meshes using extended anisotropic, geometry-adaptive refinement of polyhedra.

BACKGROUND

In the oil and gas industry, reservoir modeling involves constructing a computer model of a petroleum reservoir in order to improve estimation of reserves and making decisions regarding the development of the field. For example, geological models can be created to provide a static description of a reservoir prior to production. Reservoir simulation models may be created to simulate and predict the flow of fluids within a reservoir over its production lifetime.

One issue with reservoir simulation models is the challenge of modeling fractures within a reservoir, which requires a thorough understanding of matrix flow characteristics, fracture network connectivity and fracture-matrix interaction. Fractures can be open cracks or voids within the formation, and they can either be naturally occurring or artificially generated from a wellbore. Accurate modeling of fractures is important as fracture properties such as spatial distribution, aperture, length, height, conductivity, and connectivity significantly affect the flow of reservoir fluids to the well bore.

Mesh generation techniques are used in reservoir modeling. Two traditional mesh generation techniques for three-dimensional (3D) reservoir simulation are structured-based meshing and extrusion based meshing. In structured techniques, hexahedra are connected in a logical 3D i-j-k space with each interior mesh node being adjacent to 8 hexahedra. Extensions to structured techniques include local grid refinement where local regions of an original grid are replaced with finer grids. This can become time-consuming, computationally expensive, and prohibitively burdensome when dealing with general reservoir geometries, such as arbitrary 3D fracture surfaces. Because of the inherent 2.5 dimensional (2.5D) nature of existing extrusion techniques, similar limitations apply to these techniques. Alternative, fully unstructured meshing techniques exist, including tetrahedralization and polyhedral meshing schemes. The increased complexity of these techniques often leads to lower robustness as compared to structured techniques, especially, in the presence of imperfect geometry input (i.e., 'dirty geometry').

DETAILED DESCRIPTION

Figure 1:
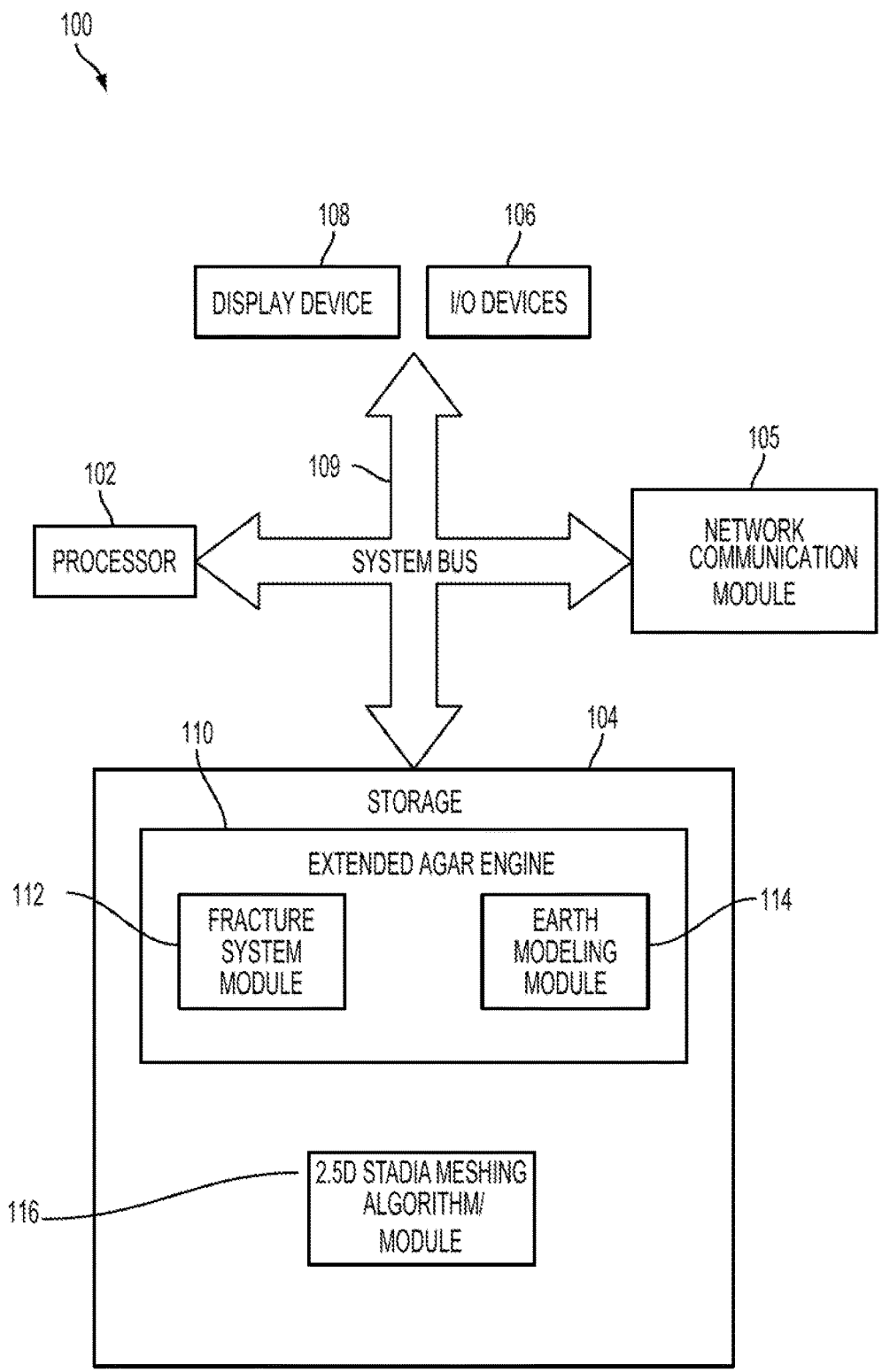
FIG. 1 is a block diagram of an extended Anisotropic, Geometry-Adaptive Refinement system for creating reservoir meshes according to certain illustrative examples of the present disclosure.

Certain aspects and features relate to generating hybrid computational meshes around complex and discrete fractures for the purpose of reservoir simulation. Illustrative examples and related methodologies of the present disclosure are described below as they might be employed in a system that applies an extended Anisotropic, Geometry-Adaptive Refinement (AGAR) of polyhedra to create a reservoir mesh. In an embodiment, an extended AGAR algorithm is used in conjunction with 2.5-dimensional (2.5D) meshers, such as a stadium mesher. Examples of stadia meshers are described with respect to FIGS. 24-28. In an embodiment, an AGAR algorithm utilizes an all-hexahedral Earth Model as a base structure into which it resolves the fracture networks being modeled. The extension of the AGAR algorithm enables the systems and methods described herein to use more general topologies in an input, base model. The AGAR extension permits a workflow that resolves the fracture networks in two phases: a 2.5 dimensional (2.5D) meshing phase; and 3-dimensional (3D) refinement phase. This combination may maintain computational speed and orientation control advantages of a 2.5D mesher where desired, while also invoking an extended AGAR algorithm to resolve general 3D fracture networks.

An extended AGAR algorithm is used so that the disclosed embodiments are not limited to working with a structured mesh. In particular, certain embodiments initially use a 2.5D stadia mesher that provides an unstructured mesher, and then use an extended, enhanced version of the AGAR algorithm to refine 3D fractures. Certain examples use AGAR techniques for scaling edges and cells. These techniques may be applied directly to additional element types, such as, for example, triangular prisms and other general prismatic elements. According to some embodiments, a set of rules is defined for refining the more general elements and to ensure that the cell refinement permits a conformal mesh topology.

In an embodiment, an AGAR extension still allows anisotropic refinement for the majority of elements in most models while removing the restriction that that the elements be hexahedra. One feature of an example of a combined workflow (see, e.g., the workflow shown in FIG. 2), is that a user can achieve the relatively fast and cellcount-efficient 2.5-dimensional mesh whenever fractures permit without specifically needing to know which fractures do or do not permit such a solution. Often, the more-conductive fractures are represented using a 2.5-dimensional-permitting geometry, and in these cases, the example techniques discussed herein can produce a highly tuned mesh in these regions, while still resolving all the other fractures, though perhaps at lower resolution.

Certain embodiments may maintain the advantages of the 2.5 dimensional mesh wherever feasible while also allowing completely general fractures to be used as input. These examples may improve upon non-extended AGAR algorithms by removing the requirement that elements be hexahedra. Certain examples may also improve upon techniques that rely solely upon a 2.5-dimensional stadium mesher by eliminating the requirement that the fractures used permit a 2.5-dimensional mesh. While freeing users from these restrictions, the disclosed AGAR extension and its combination with a 2.5D stadium mesher frees users from having to understand, and be significantly involved in, the meshing process.

Illustrative methods described herein may modify a structured grid of an Earth model to thereby create a computational mesh that 1) is suitable for use in reservoir simulation, 2) respects the original Earth model properties and geometry, and 3) resolves additional natural hydraulic fracture systems. The various examples described herein may use an extended AGAR algorithm for inserting fracture networks into an existing Earth model, which exists as a structured grid having physical property values associated therewith. The fracture network can be in the form of a surface mesh (manifold or non-manifold) in a 3D space. The structured grid of the Earth model is then anisotropically refined to resolve the fractures and to provide appropriate cell grading in the near-fracture region.

In general, cells may be examined to determine those cells that need refinement. Those cells may be refined in the appropriate directions (thus, anisotropic). Once no cell requires refinement, the process can be terminated. Refinement, as used herein, refers to the splitting of cells in the 3D space that ultimately results in a higher mesh resolution Earth model. A fracture network may then be resolved within the Earth model using the refined cells. Resolving a fracture network can include generating an Earth model and using a high-resolution mesh, in which the fractures and near-fracture areas in the model have a higher mesh resolution than the other areas of the model. Since the mesh may be used for numerical simulation, in general the smaller cells (after refinement) may result in more accurate solutions when compared to larger cells. Since reservoir simulators generate approximations of mathematical formulas, the smaller the cells, the closer the approximation mimics the mathematical formulas.

Since some of the processes apply an extended anisotropic approach when manipulating the cells, the data count and its associated computational requirements may be greatly reduced. As a result, the process may be faster and more efficient than conventional methods which apply a brute-force analysis to all cells, thus resulting in more data and resource taxing computations. Furthermore, because of the generated Earth model's relationship to the original Earth model, property interpolation is minimized and the generated Earth model respects the original property values well. Accordingly, certain embodiments of the present disclosure provide higher mesh resolution modeling while also reducing the computational requirements.

FIG. 1 shows a block diagram of a reservoir simulation and modeling system 100. System 100 includes at least one processor 102, a non-transitory, computer-readable storage 104, transceiver/network communication module 105, optional I/O devices 106, and an optional display device 108 (e.g., a display for a user interface), all interconnected via a system bus 109. Software instructions executable by the processor 102 for implementing software instructions stored within extended AGAR engine 110 may be stored in storage 104 or some other non-transitory computer-readable storage medium. Similarly, instructions executable by the processor 102 for implementing the 2.5D stadia meshing module 116 may be stored in storage 104. As shown in FIG. 1, 2.5D stadia meshing module 116 can implement a 2.5D stadia meshing algorithm or be embodied as a 2.5D stadia mesher. Although not explicitly shown in FIG. 1, system 100 may be connected to one or more public or private networks via one or more appropriate network connections. As discussed below with reference to the computing system 2900 shown in FIG. 29, the software instructions that include extended AGAR engine 110 and 2.5D stadia meshing module 116 may also be loaded into storage 104 from a CD-ROM or other appropriate storage media via wired or wireless connections.

Moreover, the techniques disclosed herein may be practiced with a variety of computer-system configurations, including hand-held devices, multiprocessor systems, microprocessor-based or programmable-consumer electronics, minicomputers, servers, mainframe computers, and the like. Any number of computer-systems and computer networks are acceptable for use with the present disclosure. The techniques disclosed herein may be practiced in distributed-computing environments where tasks are performed by remote-processing devices that are linked through a communications network. For example, the techniques disclosed herein can be performed by a cluster of computing devices operating in a cluster or a server farm. In a distributed-computing environment, program modules may be located in both local and remote computer-storage media including memory storage devices. The present disclosure may therefore, be implemented in connection with various hardware, software or a combination thereof in a computer system or other processing system.

In certain embodiments, extended AGAR engine 110 includes fracture system module 112 and earth modeling module 114. Fracture system module 112 provides the geometric definition of the fracture network, along with the petrophysical and mechanical property distributions for the fractures. Example fracture system modules may be implemented using, for example, the Fracpro® or Gohfer® platforms. Other platforms and software systems, however, can be used to implement fracture system module 112.

Extended AGAR engine 110 also includes earth modeling module 114. The earth modeling module 114 integrates with the fracture data contained within fracture system module 112 to provide subsurface stratigraphic visualization of the fractures and reservoir. The visualization can include, for example, geo science interpretation, petroleum system modeling, geochemical analysis, stratigraphic gridding, facies, net cell volume, and petrophysical property modeling. In addition, earth modeling module 114 models well paths, in addition to cross-sectional through the facies and porosity data. Earth modeling platforms include platforms such as, for example, DecisionSpace®, which is commercially offered through Halliburton Energy Services Inc. of Houston Tex. A variety of other earth modeling platforms, however, may also or instead be utilized with the present disclosure.

Extended AGAR engine 110 may also include processing circuitry to enable robust data retrieval and integration of historical and real-time reservoir related data that spans across all aspects of the well planning, construction and completion processes such as, for example, drilling, cementing, wireline logging, well testing and stimulation. Moreover, such data may include, for example, logging data, well trajectories, petrophysical rock property data, mechanical rock property data, surface data, fault data, data from surrounding wells, data inferred from geostatistics, etc. The database (not shown) which stores this information may reside within fracture system module 112 or at a remote location. An example database platform is, for example, the INSITE® software suite, commercially offered through Halliburton Energy Services Inc. of Houston Tex. A variety of other database platforms, software platforms, and associated systems can be used to retrieve, store and integrate the well related data, as described herein.

In addition, extended AGAR engine 110 may also include multi-domain workflow automation capabilities that may connect any variety of desired technical applications. As such, the output from one application, or module, may become the input for another, thus providing the capability to analyze how various changes impact the well placement and/or fracture design. Those ordinarily skilled in the art having the benefit of this disclosure realize there are a variety of workflow platforms which may be utilized for this purpose.

As generally described above, methods and embodiments of the present disclosure describe algorithms for automatic mesh refinement to resolve features in a reservoir for applications that include, but are not limited to, reservoir simulation and modeling. An important aspect of the present disclosure is the ability to selectively apply anisotropic refinement in order to reduce the degrees of freedom for subsequent analysis using the generated Earth Model.

Workflow Example

Figure 2:
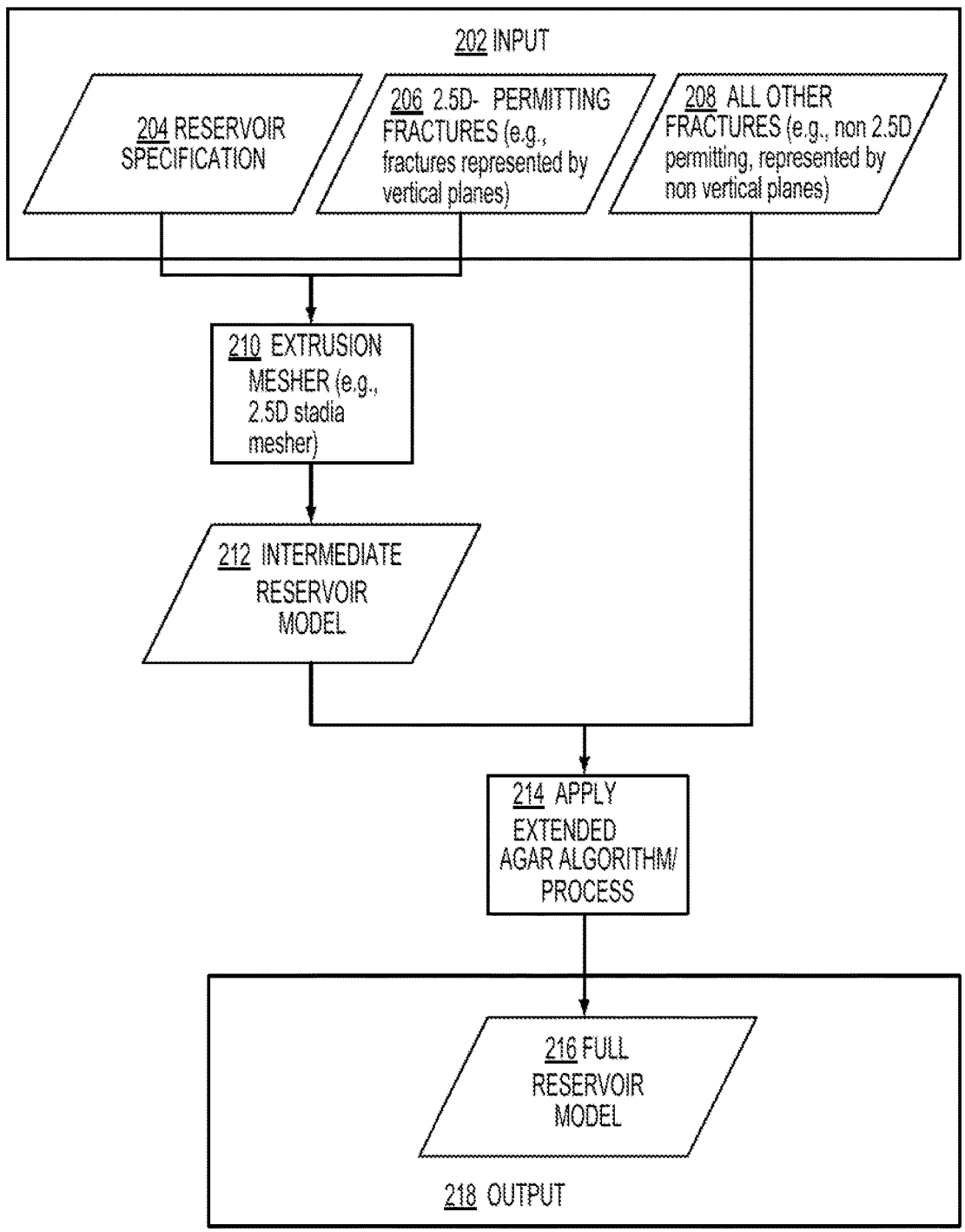
FIG. 2 is a workflow diagram illustrating a process for creating reservoir meshes using extended anisotropic, geometry-adaptive refinement of polyhedral, according to certain illustrative examples of the present disclosure.

FIG. 2 illustrates an example of a workflow 200 for creating reservoir meshes using extended anisotropic, geometry-adaptive refinement of polyhedral. Input 202 to workflow 200 includes a reservoir model (e.g., a reservoir specification 204), and two sets of fractures 206 and 208. An example of an input model for the input 202 is provided in FIG. 8. In an embodiment, the workflow 200 begins when a user-provided reservoir specification 204 is received. At block 214, an extended AGAR algorithm is used in conjunction with a 2.5D stadium mesher 210. The reservoir specification 204 is input required by 2.5D stadium mesher 210. As shown, 2.5D stadium mesher 210 can be an extrusion mesher. As an additional component of input 202 into workflow 200, a user-provided network of fractures can be received. This network of fractures can be represented as geometry and fracture properties. In the example embodiment of FIG. 2, the set of fractures are divided into two groups: those to be resolved in the 2.5-dimensional mesh (e.g., 2.5D-permitting fractures 206); and those to be resolved only in the final, three-dimensional mesh (e.g., other fractures 208). The 2.5D-permitting fractures 206 are so-called because they permit a 2.5-dimensional mesh. As shown, the 2.5D-permitting fractures 206 can include fractures represented by vertical planes. The 2.5D-permitting fractures 206 can also include fractures represented by substantially vertical planes with respect to the horizon. The other fractures 208 can include fractures represented by horizontal planes. The other fractures 208 can also include fractures represented by substantially horizontal planes (e.g., nearly horizontal planes). The sets of fractures 206 and 208 are not necessarily exclusive. That is, some subset of fractures can be in both sets of fractures 206 and 208. In workflow 200, however, all input fractures are categorized as being in at least one of the two sets of fractures 206, 208.

In workflow 200, the 2.5-dimensional mesh is first created by using the 2.5 stadium mesher 210 to resolve the 2.5D-permitting fractures 206. Workflow 200 can use the 2.5D stadium mesher 210 to produce an extruded 2.5D mesh, which is depicted as the intermediate reservoir model 212 in FIG. 2. The 2.5D stadium mesher 210 can generate the intermediate reservoir model 212 so that it includes an extrusion mesh which models the 2.5D-permitting fractures 206 in a three-dimensional (3D) space. The extrusion mesh models some volume of the reservoir (e.g., the reservoir corresponding to the reservoir specification 204), including the 2.5D-permitting fractures 206. Examples of 2.5D stadia meshers are described in detail with reference to FIGS. 24-28 below.

Then, workflow 200 applies the extended AGAR algorithm at block 214 to resolve the other fractures 208. As shown, the intermediate reservoir model 212 and the result of resolving the other fractures 208 is combined to produce a full reservoir model 216. The full reservoir model 216 can be included in output 218 of workflow 200. In one example, the output 218 can be graphically presented in a user interface, such as the example interface provided in FIG. 9. In an alternative example, if only 2.5D-permitting fractures 206 are included as part of input 202, block 214 can be skipped, and the intermediate reservoir model 212 is used as the full reservoir model 216.

Example of Refinement of Techniques

In general, the illustrative refinement algorithms described herein refine cell edges up to 'n' time and does not split any edge (and, thus, splitting the cell) that will produce an edge shorter than the 'targetSize.' As defined herein, 'targetSize' is the desired mesh size, or edge length, for resolving the fracture width. In certain embodiments, the targetSize value is provided to the system based upon a desired level of accuracy and the desired time to solution. In order to generate the Earth models, the methods may determine whether a cell should be refined and in what direction those cells should be refined. In some embodiments, there may be two types of rules for determining whether a cell should be refined: 1) gradation rules (rules that ensure slow transitions in element side) and 2) intersection rules (rules that ensure the fractures are adequately represented).

In an example to summarize the method, consider the U-directions (one direction in a 3D space). Note that U is a direction in a topological sense, not in a Euclidean sense. The 'U-direction' for each cell is independent of the U-direction for a neighbor cell. Further, within a cell, one 'U' edge might point in a slightly different direction than another 'U' edge. As will be described in more detail below, considering the U-direction, extended AGAR engine 110 will analyze all cells within the model and refine those near-fracture cells in the U-direction if all U edges are longer than C×targetSize and at least one of the following rules are met: 1) a scaled U edge intersects a fracture; 2) for any opposing pair of edges in the U-direction, exactly one of the two scaled edges intersect a fracture; 3) a U edge has two or more 'hanging' nodes; 4) for any opposing pair of edges in the U-direction, exactly one of the two edges has two or more hanging nodes; or 5) the unscaled cell intersect a fracture but no scaled edge of the cell intersects a fracture. Referring to C×targetSize, for an implementation-specific or user-supplied scalar variable, C, system 100 will not split any edges (thus, cells) that are shorter than C×targetSize. In this illustrative method, C is selected as $\sqrt{2}$, but could be other variables such as, for example, 4/3 or any finite value. This process is repeated for each direction in the 3D space.

As used herein, the term 'hanging node' is generally used to refer to a node created during the refinement of a neighboring cell, which is not required to maintain the underlying geometry of the cell of interest. For example, the underlying geometry of may be a hexahedron (such as shown in the examples of FIGS. 3, 8, and 12-13), a prism (such as shown in the examples of FIGS. 4-8 and 10-11), or other extruded element types. Consider a cell H, when a neighboring cell is refined, an extra node is added the hexahedron-shaped cell H. This node is 'hanging' with respect to cell H. In yet other examples, the edge length requirement may be omitted for rules 3 and 4 if strict adherence to the one hanging node guideline is adopted.

Figure 3:
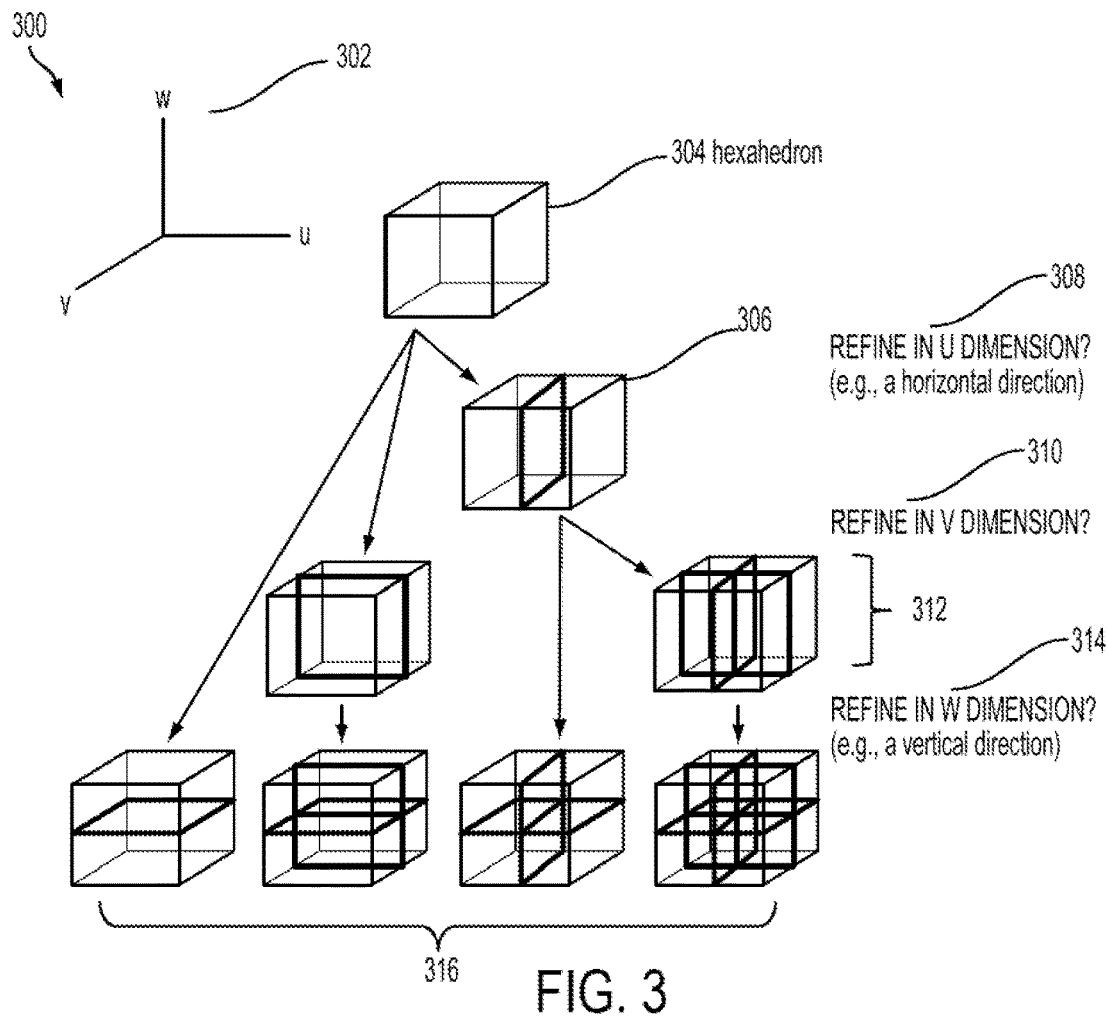
FIG. 3 depicts examples of refinement configurations for a single hexahedron cell within a three-dimensional U-V-W space, according to certain illustrative aspects of the present disclosure.

FIG. 3 illustrates a set 300 of possible refinement configurations 306, 312, and 316 for a single hexahedron cell 304 within a three-dimensional U-V-W space 302. In particular, FIG. 3 depicts how, for hexahedra, some embodiments can utilize a local, logical U-V-W space 302, and each cell is analyzed and refined in some subset of these three dimensions, U, V, and W as shown in steps 308, 310, and 314 of FIG. 3.

Once the desired refinement directions have been determined for a cell, extended AGAR engine 110 performs the refinement (i.e., splitting of edges) for that cell. FIG. 3 illustrates eight possible refinement configurations for a single cell within a 3D U-V-W space 302. Extended AGAR engine 110, via the algorithm, can iteratively performs refinement by first determining whether the near-fracture cells should be refined in the U, V, or W dimensions/directions (steps, 308, 310, and 314 shown in FIG. 3), and then, if so, spitting the edges in the directions as shown to create cell refinements 306, 312, and/or 316. The eight possible configurations of cell refinements 304, 306, 312, and 314 range from refining in no refinement directions (hexahedron 304) to refining in all three refinement directions (the right-most refinement 316). Since these cells will be those cells positioned in the near-fracture region, the mesh resolution of the resulting images will be greatly improved.

Figure 4:
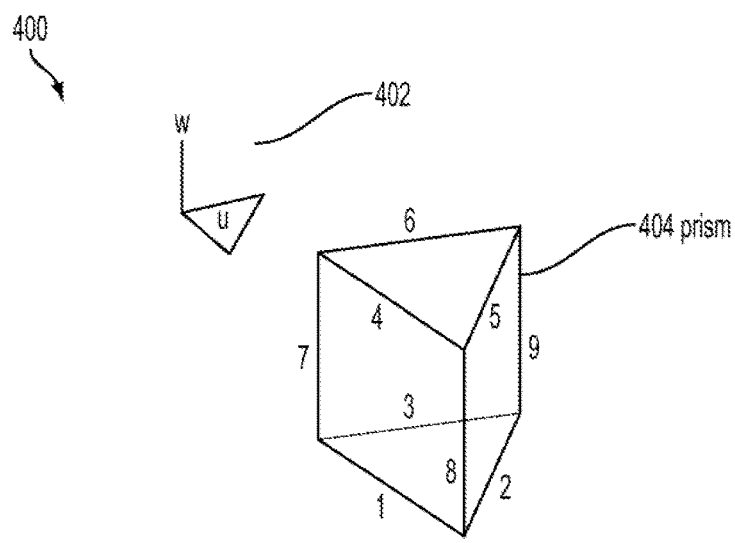
FIGS. 4 and 5 depict representative triangular prism cells showing a logical two-dimensional U-W coordinate system and a number scheme for edges of the prisms, according to certain illustrative aspects of the present disclosure.
Figure 5:
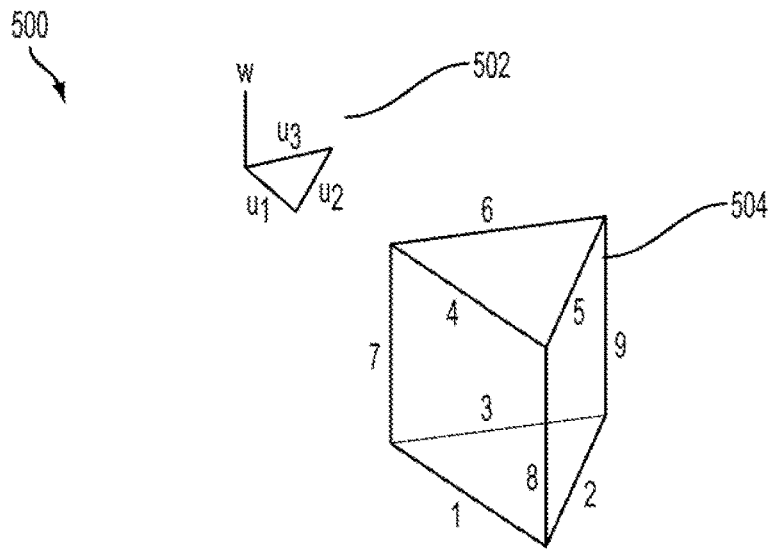

FIG. 4 shows a representative triangular prism cell 404 and a logical two-dimensional U-W coordinate system 402 and a number scheme for edges of the prism 404. Certain embodiments include two alternatives for extending the above-noted refinement concept to prisms. One is the 'single U-direction' option shown in FIG. 4. As shown in FIG. 4, the single U-direction encompasses all of the triangular face edges of prism 404. According to this definition of the directions, refinement, when it occurs on the triangular faces of prism 404, is always isotropic with respect to the face. In the example of FIG. 4, using the single U-direction option 400, each of edges 1 through 6 is considered to be in the U-direction. Refinement in U would refine all of these edges and refinement can be done in any subset of {U, W}. Another option is referred to herein as the 'multiple U-directions' option. This is illustrated in FIG. 5. FIG. 5 shows a triangular prism cell 504 and a logical two-dimensional U-W coordinate system 502 and a number scheme for edges of the prism 504. Using the 'multiple U-directions' option 500 of FIG. 5, refinement would be done in U-direction pairs. Thus, refinement could be done in a subset of the $\{U_1U_2, U_1U_3, U_2U_3, W\}$ directions 502 shown in FIG. 5. Generally, in the rules applied by certain embodiments, we do not allow all 16 permutations of the four directions (e.g., W, $U_1$, $U_2$, and $U_3$) during the refinement step. In the example of FIG. 5, the multiple U directions are considered in pairs. For example, refinement in $U_1U_2$ would refine edges 1, 2, 4, 5 of prism 504.

Figure 6:
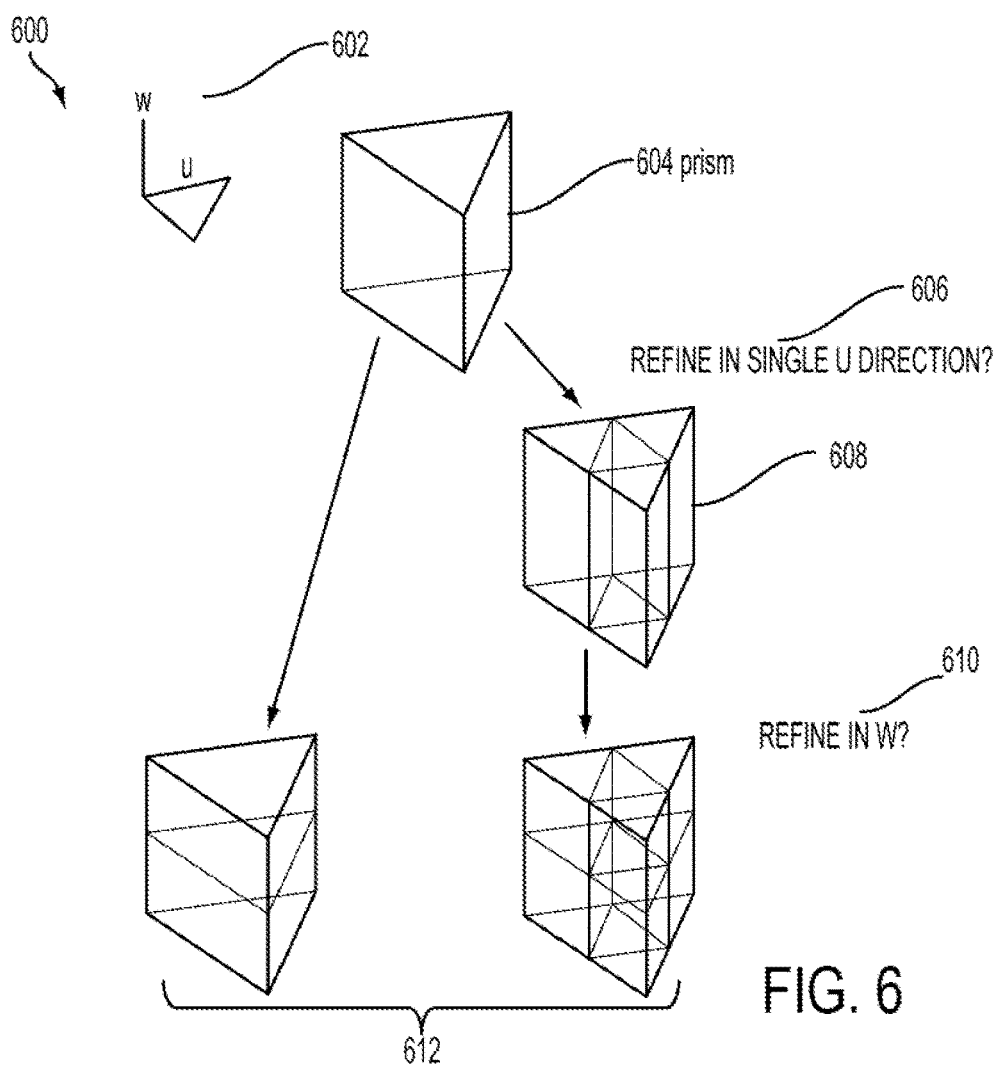
FIG. 6 depicts refinement configurations for a single prism cell using a single U-direction paradigm within the logical two-dimensional U-W coordinate system, according to certain illustrative examples of the present disclosure.

FIG. 6 provides an example of the single U-direction paradigm 600. Following the general notation and the extended AGAR algorithm discussed above, and using the canonical triangular prism numbering in FIG. 6, label the edges of the cell, $C_i$, as $\{e_{i,j}\}$ for j=1 . . . 9. We now consider an abstract Boolean function on the edges, Test($\{e_i\}$). For example, the cell can be refined in:

U if any edge from the set $\{e_{i,1}, e_{i,2}, e_{i,3}, e_{i,4}, e_{i,5}, e_{i,6}\}$ satisfies Test($\{e_{i,j}\}$) (see step 606 of FIG. 6), and W if any edge from the set $\{e_{i,7}, e_{i,8}, e_{i,9}\}$ satisfies Test($\{e_{i,j}\}$) (see step 610 of FIG. 6)

The above condition is referred to as the 'primary condition' for gradation. We now define the 'opposing conditions.' For the quadrilaterals in the prism 604, the rule is the same as it is for hexahedra (e.g., as discussed above with reference to FIG. 3). If, given two opposing edges on face, exactly one of those edges satisfies Test($\{e_{i,j}\}$), then the direction that divides those two edges will also be refined. For example, edges $\{e_{i,4}, e_{i,1}\}$ are opposing edges on a quadrilateral face. If edge $\{e_{i,4}\}$ satisfies Test($\{e_{i,j}\}$) but edge $\{e_{i,1}\}$ does not, then this condition would be satisfied, and direction W would be added the refinement set. Similarly, if edge $\{e_{i,7}\}$ satisfies Test($\{e_{i,j}\}$) but edge $\{e_{i,8}\}$ does not, direction W would be added the refinement set. For the triangular face, if exactly one satisfies Test($\{e_{i,j}\}$), then U is added to the refinement set. For example, if edge $\{e_{i,4}\}$ satisfies Test($\{e_{i,j}\}$) but edges $\{e_{i,5}, e_{i,6}\}$ do not, direction W would be added to the refinement set.

For the extended AGAR algorithm's intersection rules, we define Test($\{e_{i,j}\}$) as true if and only if $\{e_{i,j}\}$ has been refined at least twice. For the extended AGAR algorithm's gradation rules, we define Test($\{e_{i,j}\}$) as true if the scaled edge $\{e_{i,j}\}$ intersects a fracture of interest. FIG. 6 depicts the possible combinations of refinements 608 and 612 using the single U-direction paradigm 600.

Figure 7:
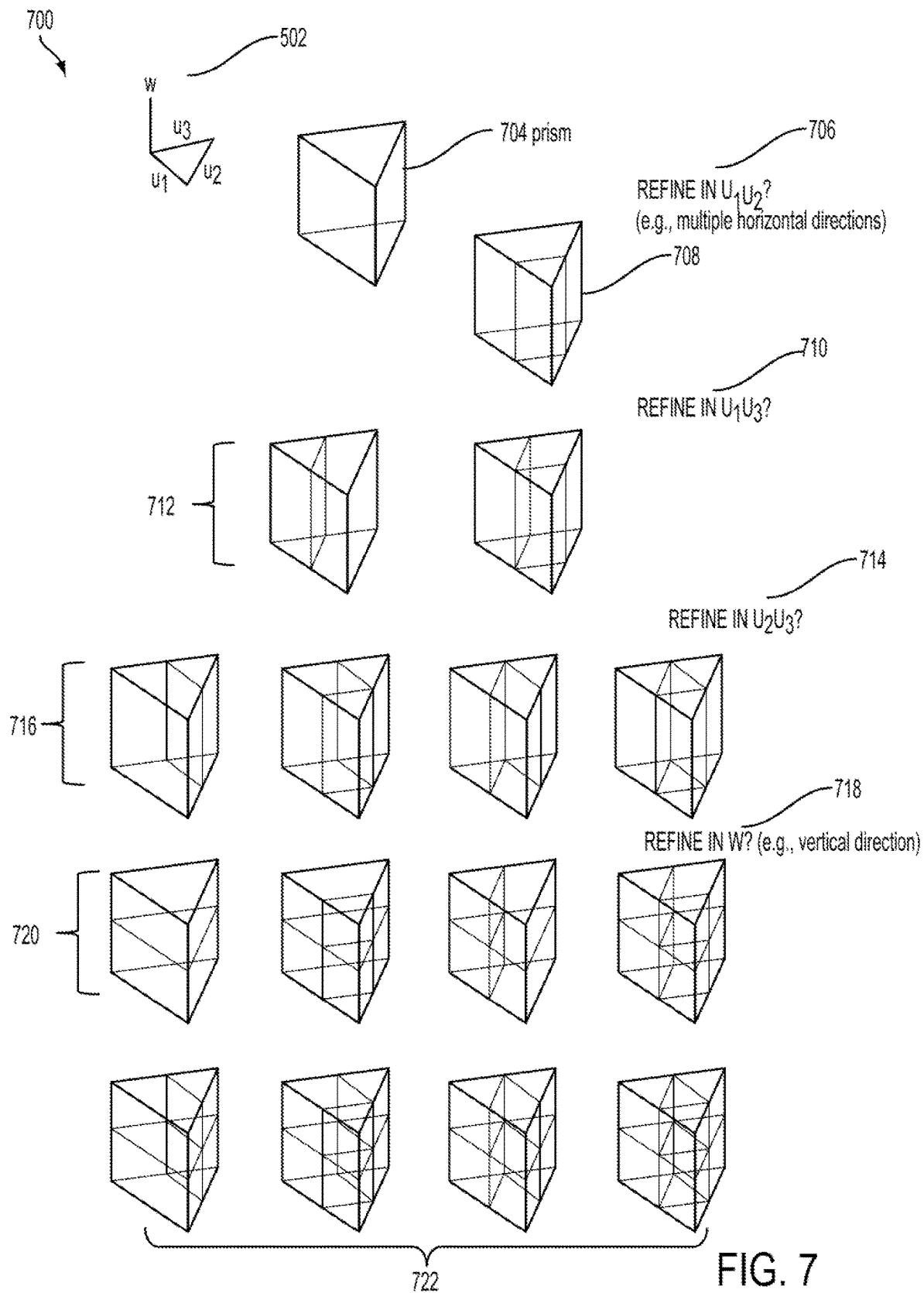
FIG. 7 illustrates refinement configurations in four directions using a multiple U-direction paradigm within the logical two-dimensional U-W coordinate system, according to certain examples of the present disclosure.

FIG. 7 shows how, in an alternative to the single U-direction discussed above with reference to FIG. 6, we can select a multiple 'U-directions paradigm 700. In particular, FIG. 7 shows refinements 708, 712, 716, 720, and 722 in the four logical dimensions/directions 702 for a multiple U directions paradigm 700 of a prism 704. Using the multiple 'U-directions paradigm 700, the cell will be refined in $U_1U_2$ and $U_1U_3$ if any edge from the set $\{e_{i,1}, e_{i,4}\}$ satisfies Test($\{e_{i,j}\}$) (see steps 706 and 710 of FIG. 7), $U_1U_2$ and $U_2U_3$ if any edge from the set $\{e_{i,2}, e_{i,5}\}$ satisfies Test($\{e_{i,j}\}$) (see steps 706 and 714 of FIG. 7), $U_1U_3$ and $U_2U_3$ if any edge from the set $\{e_{i,3}, e_{i,6}\}$ satisfies Test($\{e_{i,j}\}$) (see steps 710 and 714 of FIG. 7), and W if any edge from the set $\{e_{i,7}, e_{i,8}, e_{i,9}\}$ satisfies Test($\{e_{i,j}\}$) (see step 718 of FIG. 7).

In addition to these primary conditions, we have opposing conditions. For quadrilaterals, the two U paradigms are very similar. If, given two opposing edges on face, exactly one of those edges satisfies Test($\{e_{i,j}\}$), then the directions that divide those two edges will also be refined. If edge $\{e_{i,7}\}$ satisfies Test($\{e_{i,j}\}$) but edge $\{e_{i,8}\}$ does not, direction W would be added to the refinement set. In one example, for the triangular face rule, if exactly one edge satisfies Test($\{e_{i,j}\}$), then $U_1U_2$ and $U_1U_3$ can be added to the refinement set. In this paradigm, we add no opposing condition for the triangular faces. However, alternative rules can be determined and tested as part of paradigms beyond the paradigms 600 and 700 shown in FIGS. 6 and 7, respectively.

Figure 8:
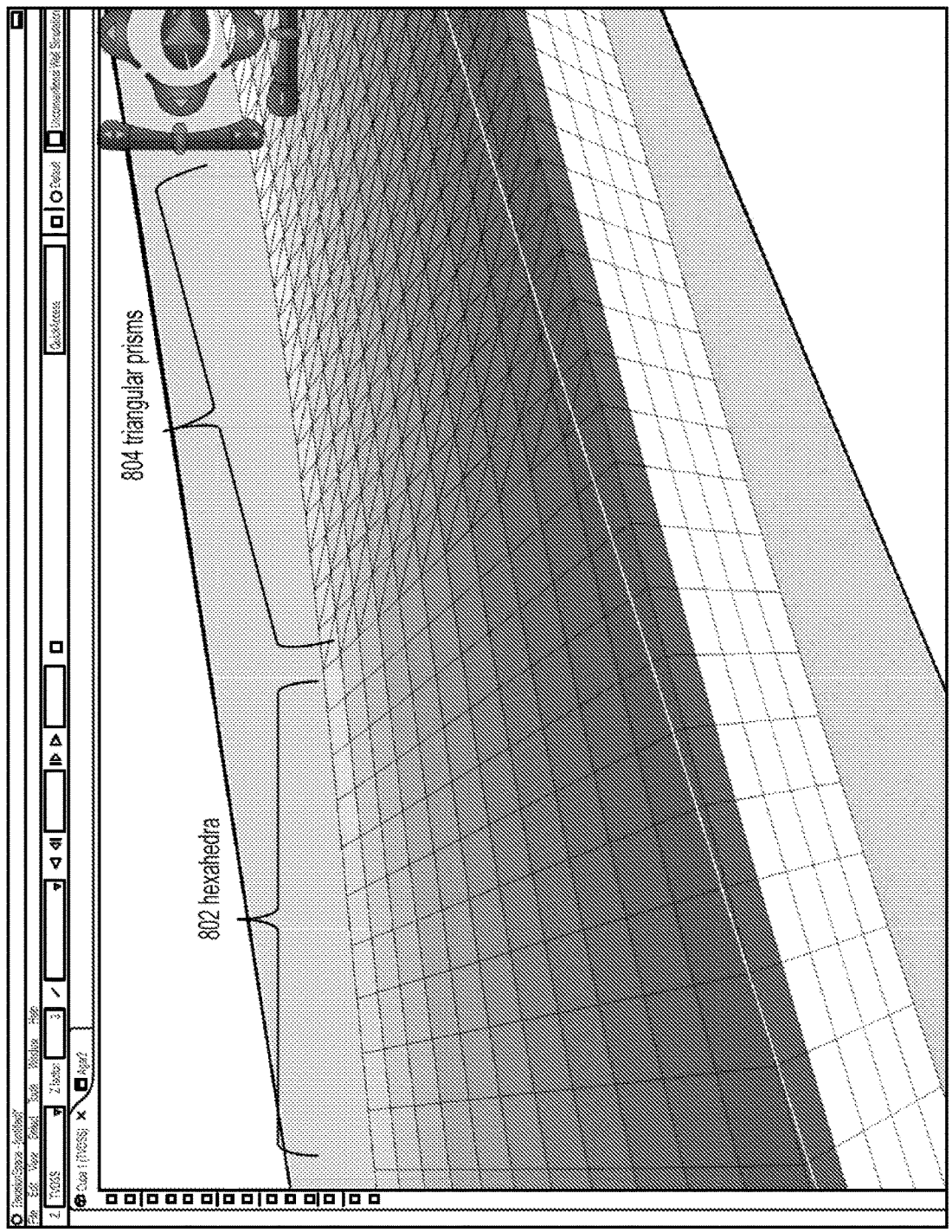
FIG. 8 depicts an interactive user interface for displaying a model containing hexahedra and triangular prisms, according to certain aspects of the present disclosure.
Figure 9:
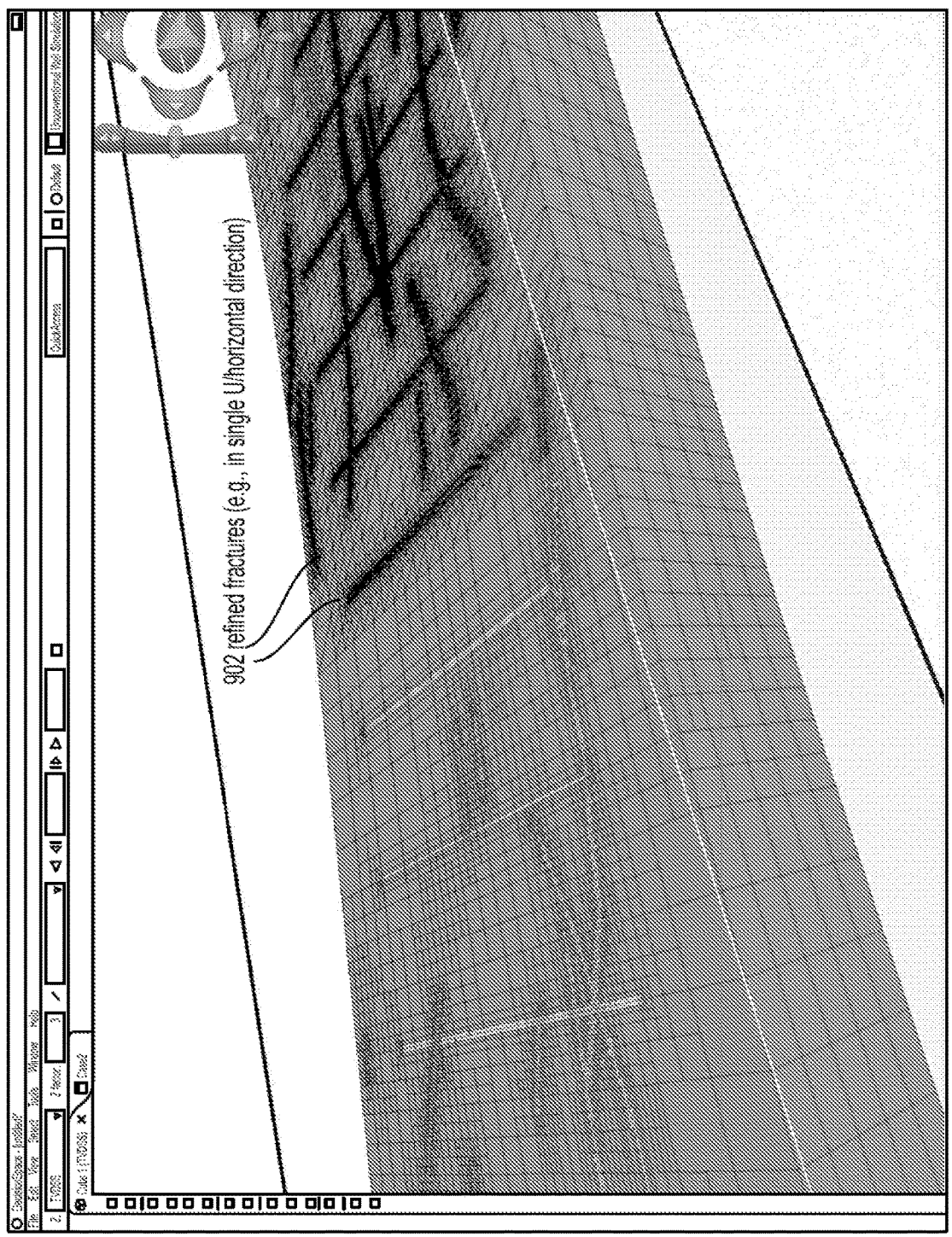
FIG. 9 illustrates an interactive user interface for displaying fractures refined into a model using a single U-direction paradigm, according to certain examples of the present disclosure.

FIGS. 8 and 9 provide example user interfaces. In particular, FIG. 8 shows a user interface 800 displaying an input model containing both hexahedra 802 and triangular prisms 804. FIG. 9 shows a user interface displaying a set of fractures 902 refined into the model from FIG. 8 using the single U-direction paradigm. As shown in FIG. 9, the anisotropic advantages are greatly reduced for the prisms, using the single U-direction paradigm, but only in the horizontal directions. Much of the anisotropic behavior is maintained in the vertical direction. This is because the vertical direction is not unnecessarily refined.

Figure 10:
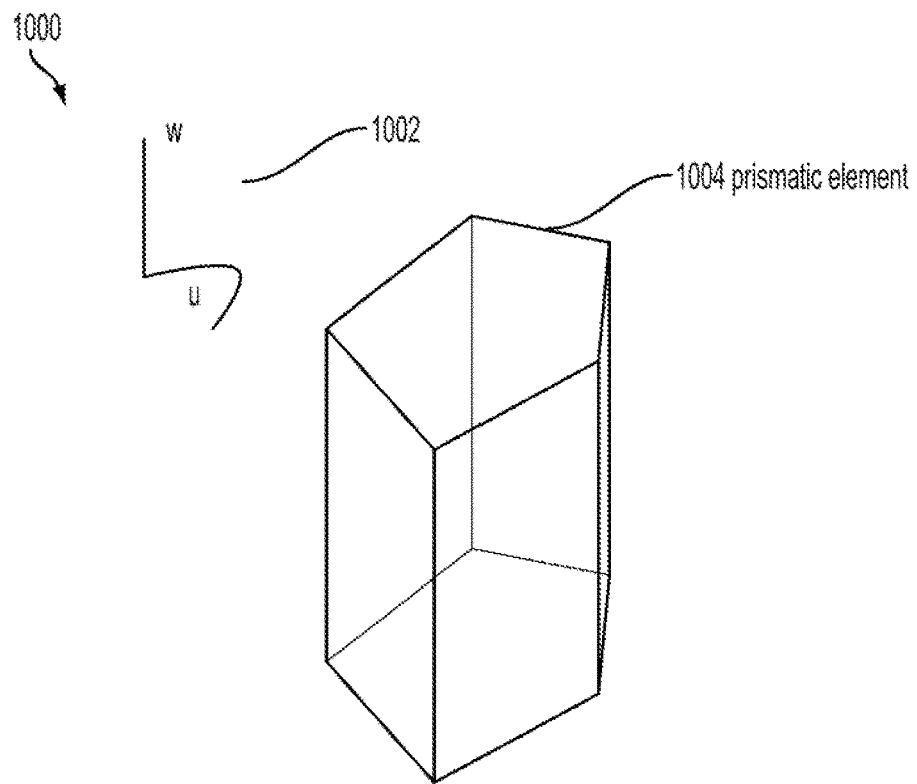
FIG. 10 illustrates a representative non-triangular prism (e.g., a general prismatic element) showing the logical two-dimensional coordinate system, according to certain features of the present disclosure.
Figure 11:
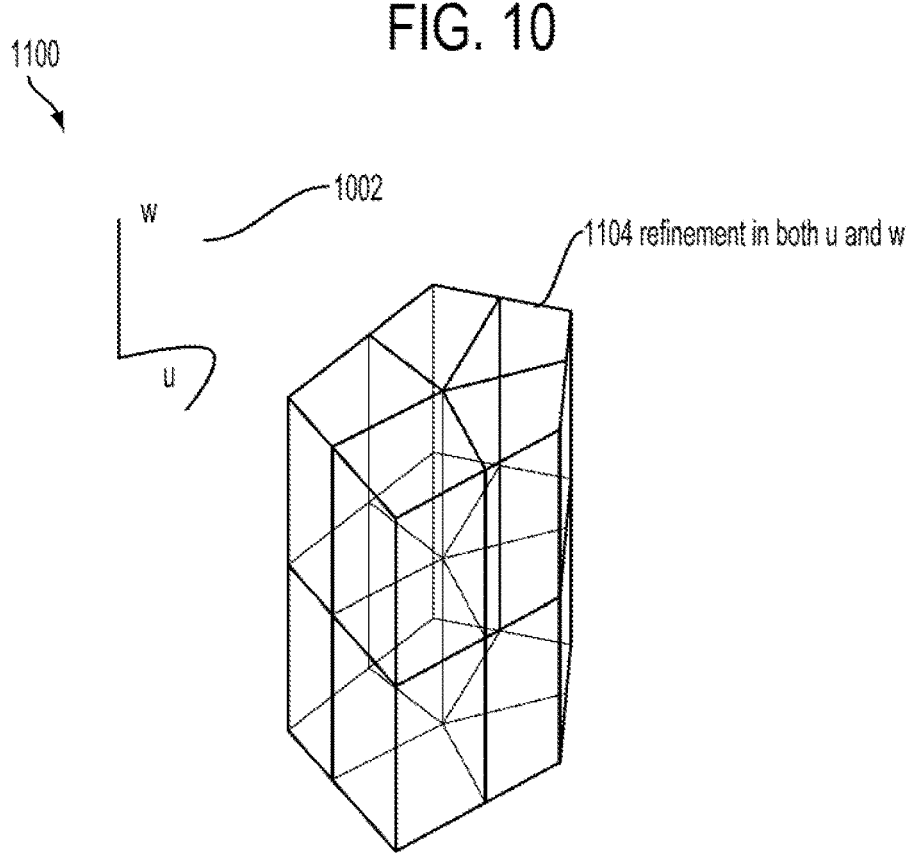
FIG. 11 illustrates possible refinement of a general prismatic element by subdividing the element into hexahedra, according to certain illustrative examples of the present disclosure.

FIG. 10 illustrates a representative non-triangular prism 1004 (e.g., a general prismatic element) showing the logical two-dimensional coordinate system 1002. FIG. 11 illustrates possible refinement of a general prismatic element 1104 by subdividing the element into hexahedra. As described above, the extended AGAR algorithm can be used to implement methods that extend the hexahedra-based AGAR scheme to also include triangular prisms, such as those shown in FIGS. 4-7. For extruded triangle and quadrilateral meshes, that combination is sufficient. Assuming a consistent extruded topology, the paradigms discussed above with reference to FIGS. 4-7 will result in a valid mesh even if some of the elements are degenerate. FIGS. 10 and 11 show how certain embodiments can directly extend the single U-direction paradigm to non-triangular prisms, utilizing a mid-point subdivision algorithm. For non-triangular prisms, such as non-triangular prism 1004 of FIG. 10, we can maintain the anisotropy in the U-W space 1002. As can be seen in refinement 1104 of FIG. 11, using this refinement algorithm, the non-hexahedral prismatic elements 1004 are subdivided into hexahedra. Since hexahedra have three logical dimensions, compared to the two shown in FIGS. 10 and 11 for the non-hexahedral prismatic elements, the opportunity for anisotropic refinement is increased after the refinement of the original element.

To generalize further, we can apply a mid-point subdivision algorithm for all convex polyhedral cells, even non-extruded cells. Note that this would change the refinement algorithm for triangular prisms from that discussed above with reference to FIGS. 4-7 However, for the non-extruded cells, we use a single dimensional U space, dropping the anisotropic refinements for these general cells. In cases where the majority of cells are extruded (hexahedral cells or other prismatic cells), the anisotropy for those cells will still provide a significant advantage over fully isotropic refinement. Further, anisotropic refinement on a regular cell neighboring an irregular cell does not violate the conformal requirement on the mesh. The irregular neighbor cell's polygonal face is simply divided.

Now that a summarized description of example refinement methods have been provided, a more detailed discussion of example techniques for reservoir mesh creation will now be provided. In order to generate the reservoir Earth models, an example method first determines which cells need to be refined and in which direction those cells should be refined. To achieve this in this example, extended AGAR engine 110 first begins with a uniform, axially-aligned, structured hexahedral grid. However, in other examples, it is not necessary to begin with a uniform, axially-aligned grid. Nevertheless, as data input to the refinement algorithm, extended AGAR engine 110 requires: 1) M=$\{C_i\}$, the initial set of mesh cells to be refined, 2) F=$\{F_i\}$, the set of triangular facets representing the fractures, 3) ω, desired 'width' of cells to adequately resolve fractures, and 4) α, desired mesh size 'along' the fractures.

Because the initial grid, M, is uniform, there is a characteristic grid size, ττ. Therefore, extended AGAR engine 110 computes two numbers:

$$n_{iso} = \left\lfloor \log_{\frac{1}{2}} \frac{\alpha}{\tau} \right\rfloor, \text{and} \qquad \text{Eq. (1)}$$

-continued $$n_{tot} = \left\lfloor \log_{\frac{1}{2}} \frac{\omega}{\tau} \right\rfloor, \text{ where} \quad \text{Eq. (2)}$$

$$n_{ani} = n_{tot} - n_{iso}.$$

that will define the number of levels of refinement performed by extended AGAR engine 110. Extended AGAR engine 110 will perform $n_{iso}$ $n_{iso}$ levels of isotropic refinement to obtain a mesh of size, $$\hat{\alpha} = \tau \left(\frac{1}{2}\right)^{n_{iso}},$$

near the fractures. Then, extended AGAR engine 110 will perform $n_{ani}$ $n_{ani}$ levels of anisotropic refinement to obtain a mesh of 'width', $$\hat{\omega} = \tau \left(\frac{1}{2}\right)^{n_{tot}},$$

near the fractures. Note that we have $\hat{\alpha} \cong \alpha$ and $\hat{\omega} \cong \omega$.

Accordingly, in one illustrative method, the general algorithm applied by extended AGAR engine 110 may be expressed as:
  refine(n, doIsotropic, targetSize)
    for iteration=1 . . . ∞
  sizeLimit=targetSize *$2^{n-min(n,iteration)}$
    for C in M //Loop over each cell in the mesh at this iteration
      directions=determineDirections(C,F,iteration,sizeLimit,n,doIsotropic)
      refineInGivenDirections(directions,C)
    if no changes were made during this iteration
      exit routine In this routine 1, the 'Refine' algorithm is called with an integer to specify how many levels of refinement to perform and a Boolean to specify whether it is isotropic refinement or not. Note that, in this example, the routine is called twice. Extended AGAR engine 110 calls refine($n_{iso}$,true,$\hat{\alpha}$) followed by refine($n_{ani}$, false, $\hat{\omega}$). Essentially, to perform n levels of refinement, extended AGAR engine 110 loops over the cells until no more changes are required. Because extended AGAR engine 110, via the algorithm, disallows splitting any edge that is shorter than C×targetSize during any iteration, the algorithm will ultimately terminate. One of the most complex parts of the algorithm is encapsulated in the 'determineDirections' method, given in routine 2 below that returns a subset of the local 3D directions {U, V, W} depending on which directions should be refined. Note that the 'sizeLimit', used to define the smallest edge during any iteration, is large for early iterations. By the $n^{th}$ iteration, and for all subsequent iterations, sizeLimit is equal to targetSize. Routine 2 may be expressed as:
  determineDirections(C,F,iteration,sizeLimit,n,doIsotropic)
    directions=∅
    //add any refinement directions required due to fracture-cell intersection
    //this is only allowed during the first n iterations
    if iteration<=n//in the intersection stage
      directions=getDirectionsFromIntersections(C,F)
    //add any refinement directions required due to gradation
    //this will only be necessary for iteration >1 if iteration >1
      directions=directions U getDirectionsFromGradation(C)C)
    //if we want isotropic and we found any direction, do all directions
    if doIsotropic & (directions≠∅)
      directions=ALL
    //remove any directions disallowed, regardless of what we have found directions=directions−getDisallowedDirections(C,F,sizeLimit)
    return directions In this illustrative Routine 2, 'determineDirections' primarily uses sub-routines getDirectionsFromGradation and getDirectionsFRomIntersections. As shown in 'determineDirections' from Routine 2, only during the first n iterations, does extended AGAR engine 110 refine near-fracture cells based on the interaction with the fractures, which will be described in more detail below. During any iteration after the first, extended AGAR engine 110 refines cells based on the 'one hanging node rule.' That is, if an edge of the cell has been split more than once (due to a neighbor being refined), the cell can be refined. If the extended AGAR engine 110 is performing an 'isotropic' refinement, then whenever it needs to refine a cell in any direction, it refines the cell in all directions.

All of the directions marked for refinement must pass a final test before being accepted. By refining in a given direction, four edges can be split. If any of those four edges are shorter than C×targetSize, then the direction is rejected by extended AGAR engine 110.

Figure 12:
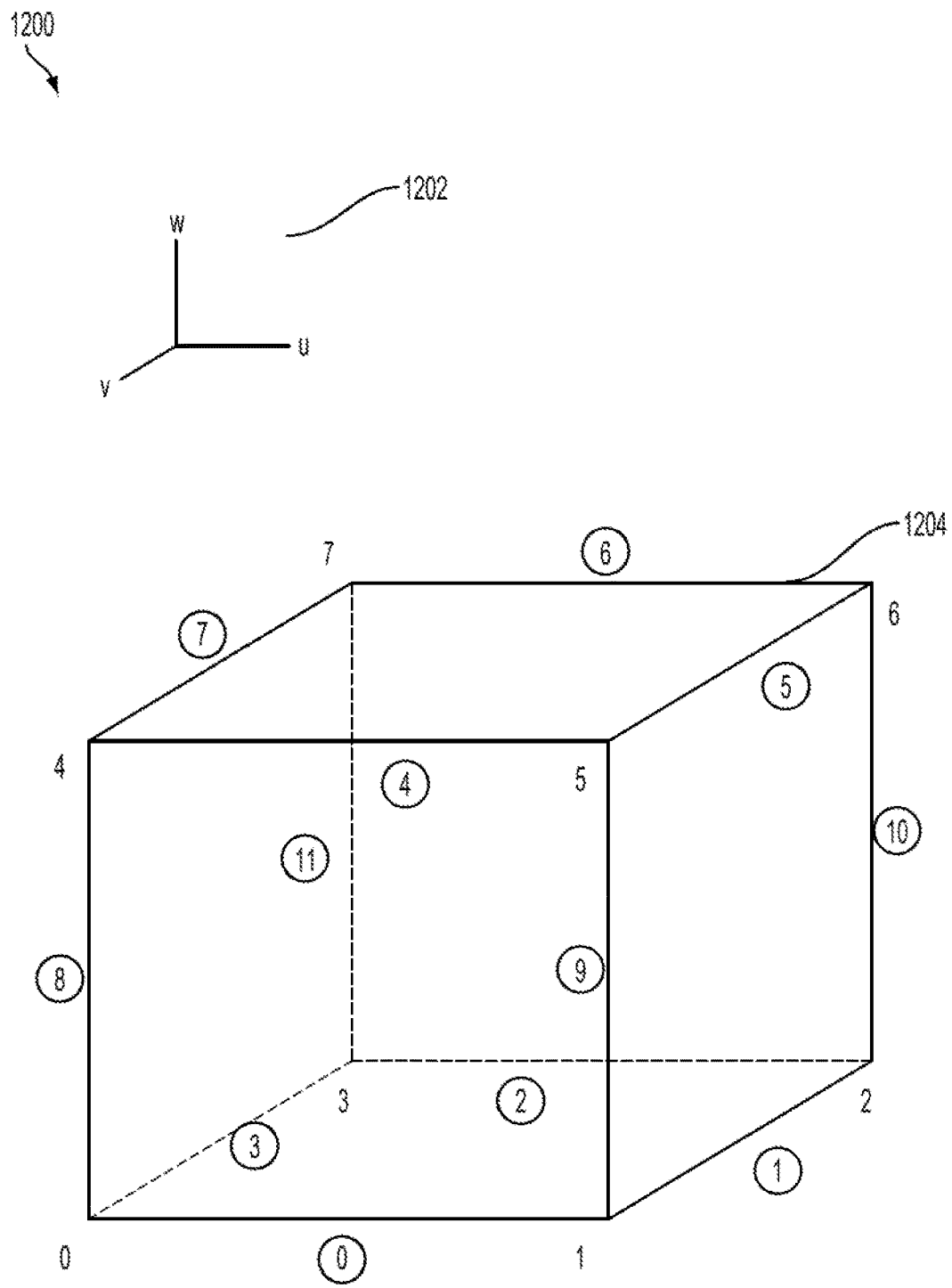
FIG. 12 illustrates a representative cell showing the local three-dimensional coordinate system and a number scheme, according to certain illustrative aspects of the present disclosure.

Because the initial mesh can include hexadedra, each cell can be represented by a canonical numbering system described below with reference to FIG. 12. FIG. 12 illustrates a representative cell 1204 showing the local 3D coordinate system 1202 and numbering scheme 1200. In FIG. 12, the U-V-W directions are defined by the mapping of the nodes to this numbering system (note that it is drawn as a left-handed system). In numbering scheme 1200, numbers representing edges are circled, while numbers representing nodes are not circled. The mapping of the U-V-W system 1202 to the x-y-z system may differ for neighboring cells. In this example, consider edges {0,2,4,6} to be U edges, edges {1,3,5,7} to be V edges, and edges {8,9,10,11} to be W edges.

Using the canonical numbering scheme in FIG. 12, the edges of the cell, $C_i$, are labeled as $\{e_{i,j}\}$ for j=0 . . . 11. The returned set from getDirectionsFromGradation($C_i$) includes: 1) U if any edge from the set $\{e_{i,0}, e_{i,2}, e_{i,4}, e_{i,6}\}$ has been refined at least twice, 2) V if any edge from the set $\{e_{i,1}, e_{i,3}, e_{i,5}, e_{i,7}\}$ has been refined at least twice, and 3) W if any edge from the set $\{e_{i,8}, e_{i,9}, e_{i,10}, e_{i,11}\}$ has been refined at least twice. This condition is referred to as the 'primary condition' for gradation. Further, if, given two opposing edges on a face, exactly one of those edges has been refined at least twice, then the direction that divides those two edges will also be refined by extended AGAR engine 110. For example, edges $\{e_{i,8}, e_{i,9}\}$ are opposing edges on a face. If edge $\{e_{i,8}\}$ has been refined twice but edge $\{e_{i,9}\}$ has been refined once, then this condition would be satisfied, and direction U would be added to the refinement set. This test is referred to as the 'opposing condition' for gradation. Note that for all tests in getDirectionsFromGradation, extended AGAR engine 110 only considers the number of times the edge was split (i.e., refined) prior to the current iteration. In this way, extended AGAR engine 110 lessens its dependence on the order in which the cells can be seen by the algorithm.

Testing Cell-Facet Intersection

One aspect of the refinement algorithm utilized in certain embodiments is defining a test of whether a given cell, $C_i$, intersects a given fracture facet, $F_k$. See FIGS. 4, 5, and 12 for example numbering schemes used by extended AGAR engine 110 for nodes and edges of the cell. To continue in describing this illustrative method, the extended AGAR engine 110 can define the scaling transform, $S_{\beta(\,)}$, which scales the distance between an object's (node) center and each node by the scalar value, $\beta$. In this illustrative algorithm, $\beta$ is set to be 2, but determining the most appropriate value of $\beta$ is a design choice and may be modified, as will be understood by those ordinarily skilled in the art having the benefit of this disclosure. Note that extended AGAR engine 110 may apply this transform to the cell, yielding a scaled cell, or to the edges, yielding a set of scaled edges. These two applications of the transform yield different results, as shown in FIGS. 13 and 14, which illustrate the scaling function, $S_{\beta(\,)}$, applied to a cell, and the scaling function, $S_{\beta(\,)}$, applied to the edges of the cell, respectively.

Figure 13:
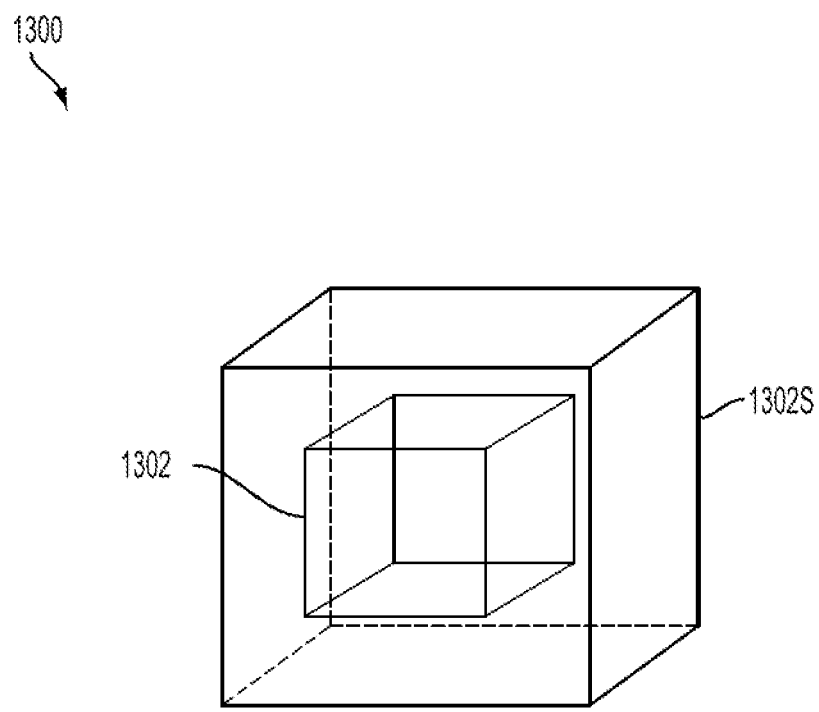
FIGS. 13 and 14 illustrate the application of scaling functions to a cell and its edges, respectively, according to certain illustrative features of the present disclosure.
Figure 14:
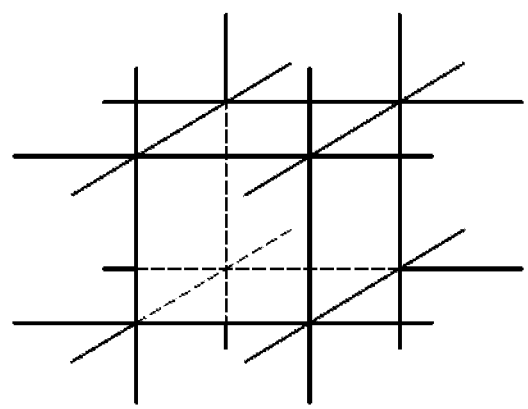

Still referring to FIGS. 13 and 14, the Boolean function $\tau_\beta(C_i,F)$ is true if and only if there exists a fracture $F_k \in F$ such that the intersection of the scaled cell and the fracture is nonempty ($S_\beta(C_i) \cap F_k \neq \emptyset$). For edges, the function is slightly altered so that it will return false whenever the edge lies in the plane of the facet. Therefore, for edges, $\tau_\beta(e_{i,j},F)$ is true if and only if there exists a fracture $F_k \in F$ such that both the intersection of the scaled edge and the fracture is nonempty and $F_k$'s normal is not perpendicular (or transverse in other examples) to the edge ($[(S_\beta(e_{i,j}) \cap F_k \neq \emptyset)$ & $(\text{normal}(F_k) \cdot e_{i,j} > \in)]$ for some a specified, small $\in$). Essentially, the function is true when the scaled entity intersects the facets, excepting the case of the edge lying in the plane of the facet. Therefore, this results in the edge being split along a plane that is transverse (e.g., perpendicular) to an axis of the fracture within the fracture network.

Now, an illustrative algorithm used in Routine 2 that defines getDirectionsFromIntersections($C_i$,F) is specified. Note that, as in the case of the gradation tests above, the intersections tests include analogous 'primary conditions' and 'opposing conditions.' This routine 3 can be expressed as, for example:

---

Set<Directions> getDirectionsFromIntersections($C_i$,F)
  directionSet = Ø
  // do nothing if no facets intersect the scaled cell
  If $\tau_\beta(C_i,F)$ == false
    return directionSet
  // the 'primary' condition
  //If a scaled edge intersects the fracture set, we refine perpendicular to it
  if ($\mathcal{T}_\beta(e_{i,0},\mathcal{F}) | \mathcal{T}_\beta(e_{i,2},\mathcal{F}) | \mathcal{T}_\beta(e_{i,4},\mathcal{F}) | \mathcal{T}_\beta(e_{i,6},\mathcal{F})$)
    directionSet = directionSet ∪ U
  if ($\mathcal{T}_\beta(e_{i,1},\mathcal{F}) | \mathcal{T}_\beta(e_{i,3},\mathcal{F}) | \mathcal{T}_\beta(e_{i,5},\mathcal{F}) | \mathcal{T}_\beta(e_{i,7},\mathcal{F})$)
    directionSet = directionSet ∪ V
  if ($\mathcal{T}_\beta(e_{i,8},\mathcal{F}) | \mathcal{T}_\beta(e_{i,9},\mathcal{F}) | \mathcal{T}_\beta(e_{i,10},\mathcal{F}) | \mathcal{T}_\beta(e_{i,11},\mathcal{F})$)
    directionSet = directionSet ∪ W
  //the 'opposing' condition
  //If 'opposing' edges have a different sign, refine the splitting direction if $\left( \begin{array}{l} \mathcal{T}_\beta(e_{i,8},\mathcal{F}) \neq \mathcal{T}_\beta(e_{i,9},\mathcal{F}) | \mathcal{T}_\beta(e_{i,10},\mathcal{F}) \neq \mathcal{T}_\beta(e_{i,11},\mathcal{F}) | \\ \mathcal{T}_\beta(e_{i,1},\mathcal{F}) \neq \mathcal{T}_\beta(e_{i,3},\mathcal{F}) | \mathcal{T}_\beta(e_{i,5},\mathcal{F}) \neq \mathcal{T}_\beta(e_{i,7},\mathcal{F}) \end{array} \right)$ directionSet = directionSet ∪ U if $\left( \begin{array}{l} \mathcal{T}_\beta(e_{i,8},\mathcal{F}) \neq \mathcal{T}_\beta(e_{i,11},\mathcal{F}) | \mathcal{T}_\beta(e_{i,9},\mathcal{F}) \neq \mathcal{T}_\beta(e_{i,10},\mathcal{F}) | \\ \mathcal{T}_\beta(e_{i,0},\mathcal{F}) \neq \mathcal{T}_\beta(e_{i,2},\mathcal{F}) | \mathcal{T}_\beta(e_{i,4},\mathcal{F}) \neq \mathcal{T}_\beta(e_{i,6},\mathcal{F}) \end{array} \right)$ directionSet = directionSet ∪ V if $\left( \begin{array}{l} \mathcal{T}_\beta(e_{i,3},\mathcal{F}) \neq \mathcal{T}_\beta(e_{i,7},\mathcal{F}) | \mathcal{T}_\beta(e_{i,1},\mathcal{F}) \neq \mathcal{T}_\beta(e_{i,5},\mathcal{F}) | \\ \mathcal{T}_\beta(e_{i,0},\mathcal{F}) \neq \mathcal{T}_\beta(e_{i,4},\mathcal{F}) | \mathcal{T}_\beta(e_{i,2},\mathcal{F}) \neq \mathcal{T}_\beta(e_{i,6},\mathcal{F}) \end{array} \right)$ directionSet = directionSet ∪ W
  //if set is empty but a facet intersects the unscaled cell, refine all
  If(directionSet = Ø & $\mathcal{T}_0(C_i,\mathcal{F})$ )
    directionSet = U ∪ V ∪ W

---

Note that the 'Refine' algorithm can be invoked or called by extended AGAR engine 110 with an integer to specify how many levels of refinement to perform and a Boolean to specify whether it is isotropic refinement or not.

Figure 15:
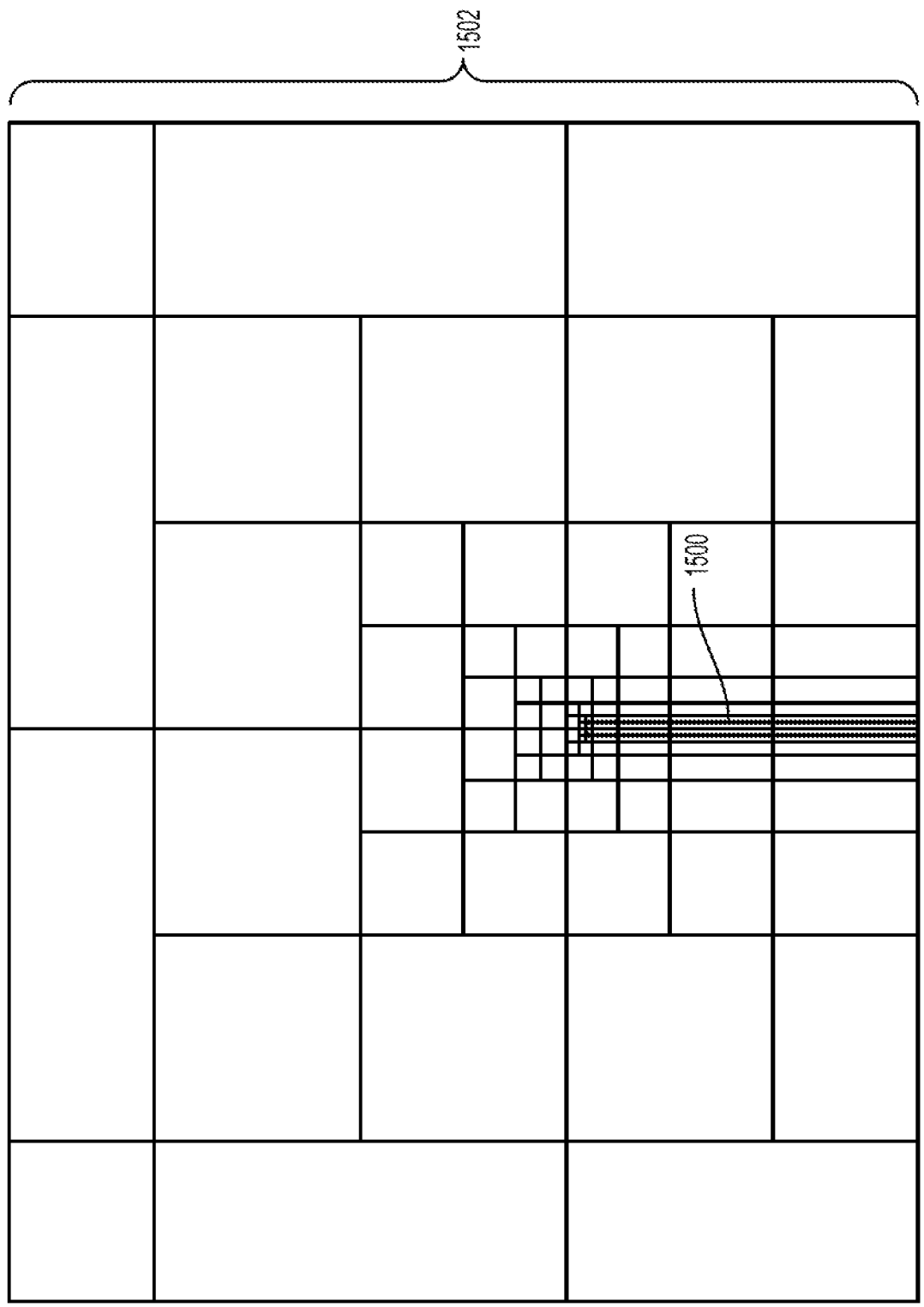
FIGS. 15 and 16 illustrate two different refinements generated using illustrative methods of the present disclosure.
Figure 16:
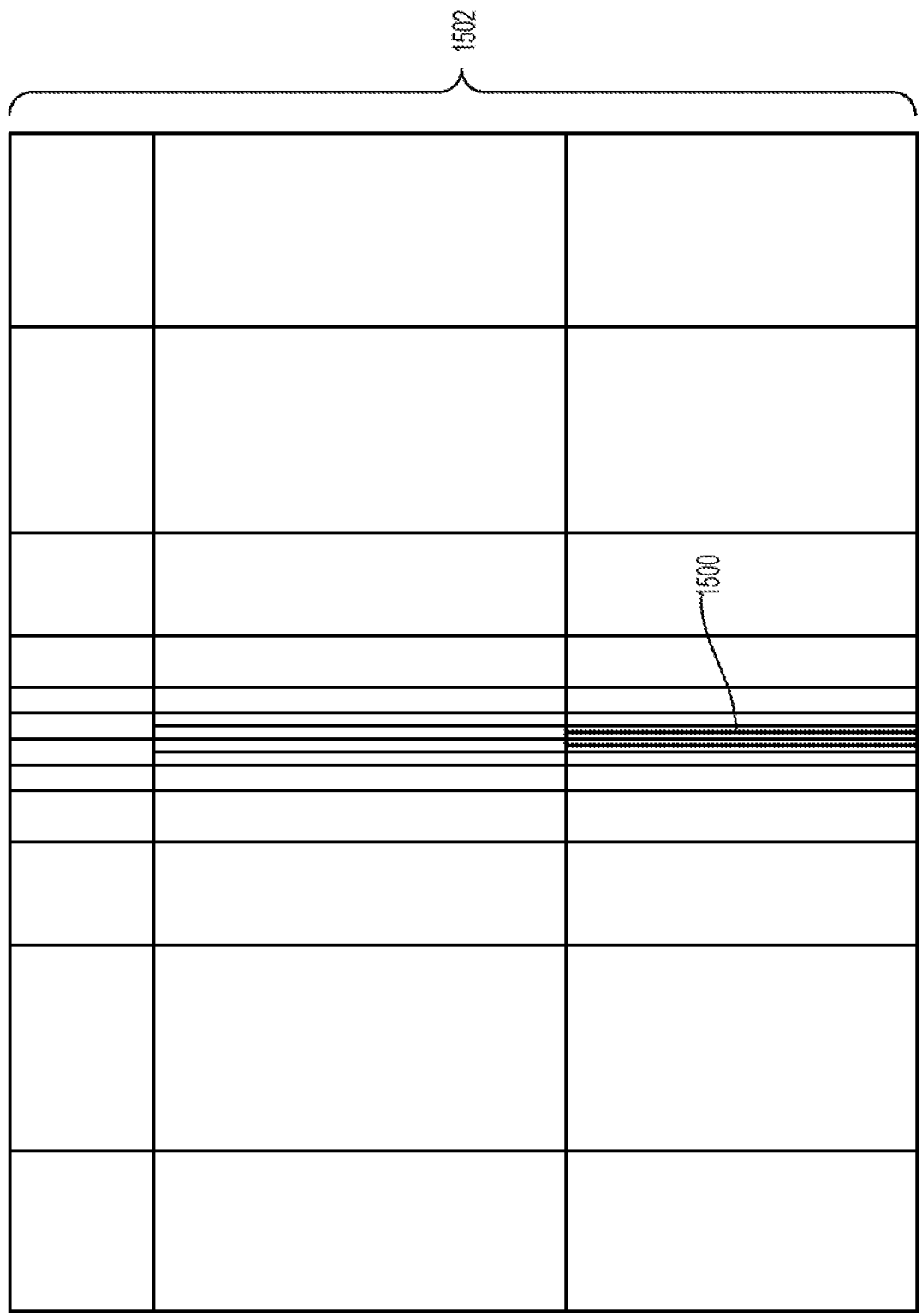

FIGS. 15 and 16 illustrate images 1500 extended AGAR meshes generated using illustrative features of the present disclosure. In certain example methods, the 'opposing conditions,' for determining the refinement directions, can be used to restrict the anisotropic refinement in a localized (e.g., near-fracture) region. For example, consider FIG. 15, which shows AGAR refinement near the end of a planar fracture 1500, and FIG. 16, which shows the same model from FIG. 15 using an extension of AGAR with the 'opposing conditions' disabled. In the examples of FIGS. 15 and 16, fracture 1500 is shown surrounded by various cells 1502 in the near-fracture region. Without the 'opposing conditions' for the refinement direction selection as shown in FIG. 16, the end of the fracture 1500 would not have been resolved and the anisotropic refinement would have continued through the top of image 1500.

Figure 17:
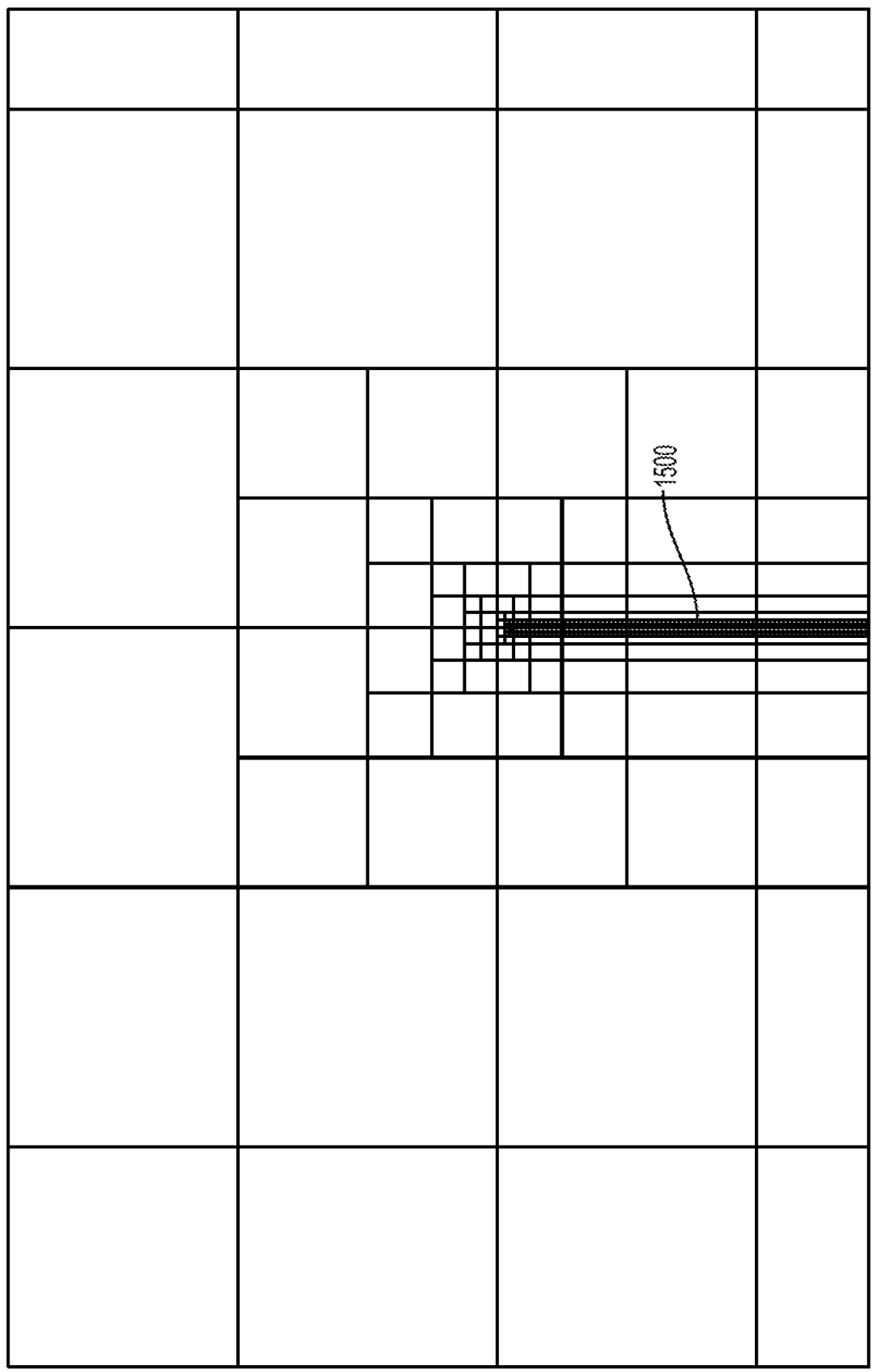
FIGS. 17 and 18 are examples of images of meshes generated using illustrative aspects of the present disclosure.
Figure 18:
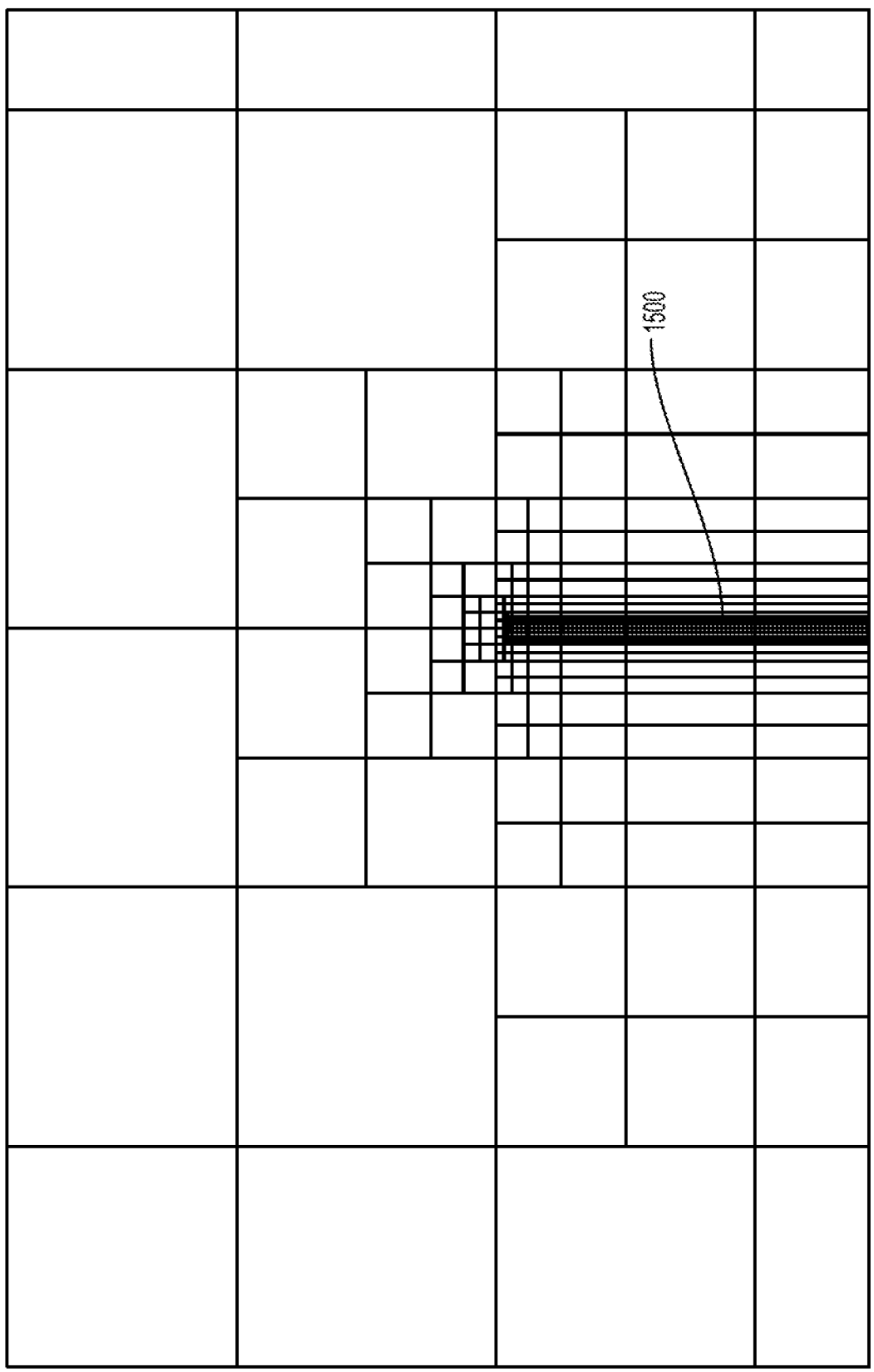

FIGS. 17 and 18 are additional images of AGAR meshes generated using illustrative aspects of the present disclosure. FIG. 17 shows an end of the fracture 1500 with $\beta=2$, thus resulting in a mesh containing 1500 cells. FIG. 18 shows an end of fracture 1500 with $\beta=4$, thus resulting in a mesh with 2260 cells.

Figure 19:
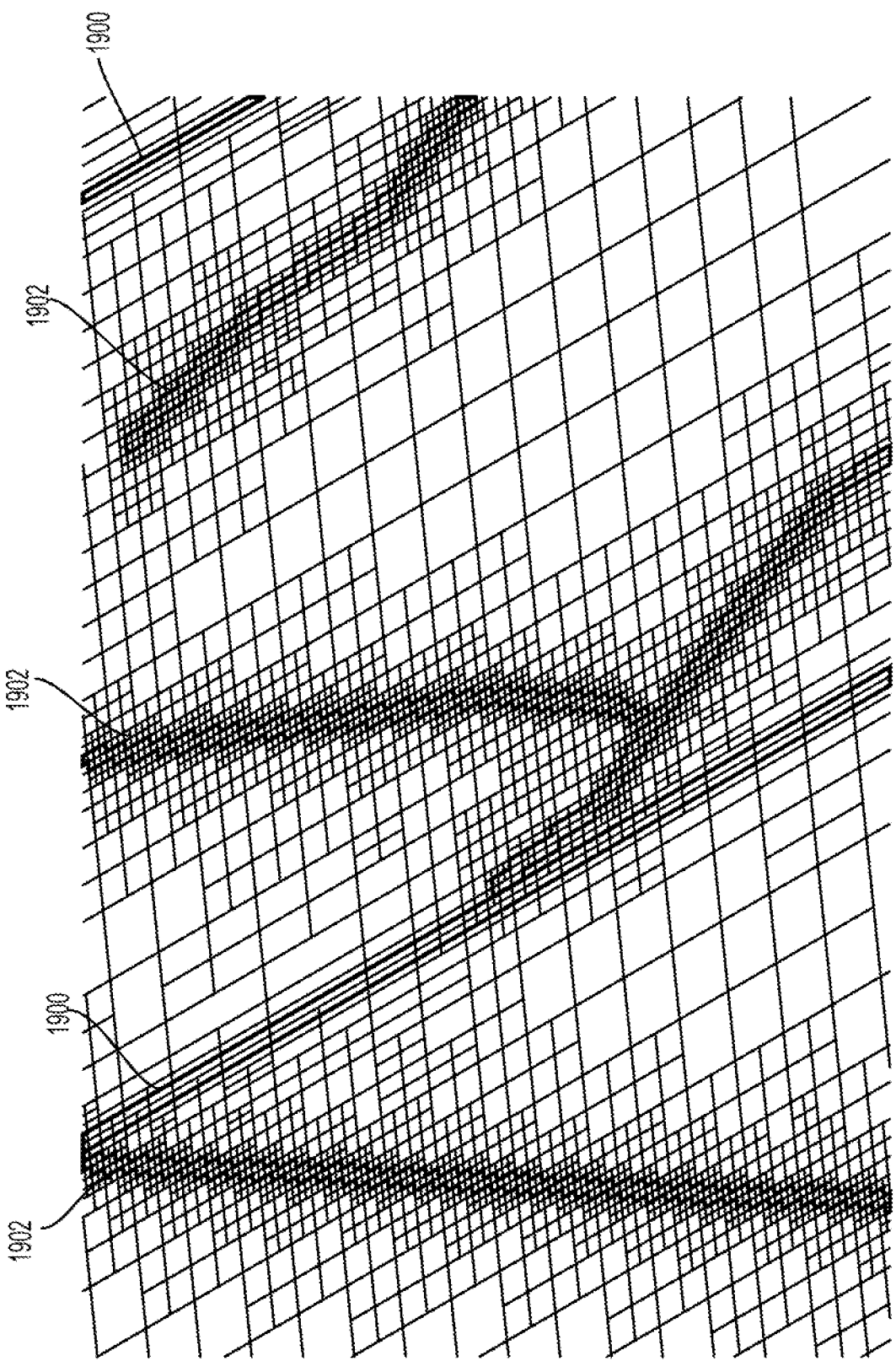
FIGS. 19 and 20 are full Earth models generated using certain example methods of the present disclosure.
Figure 20:
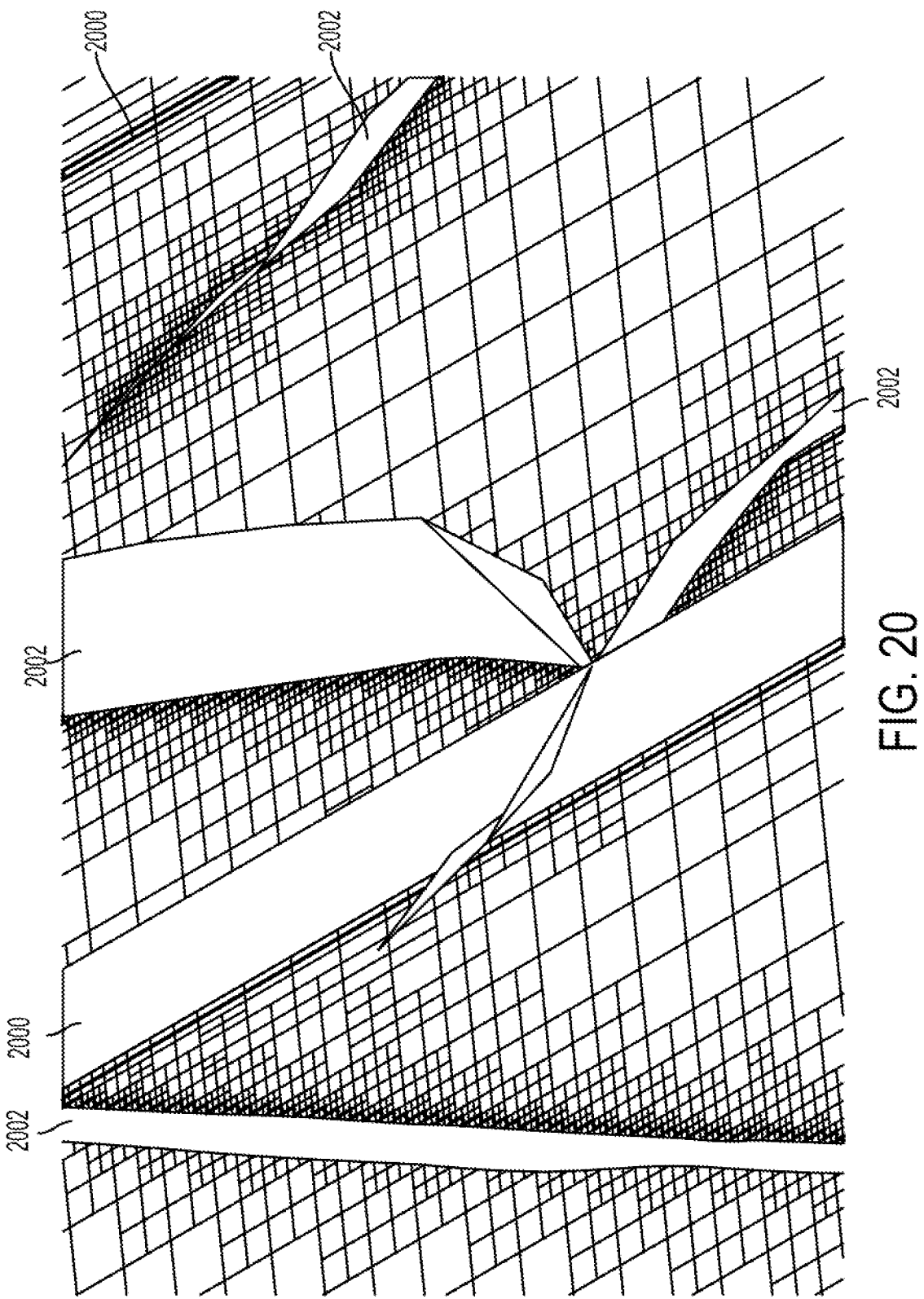

FIGS. 19 and 20 show a full reservoir model with both hydraulic and natural fractures meshed using the illustrative methods described herein. In FIG. 19, a slice through an example mesh generated with the refinement algorithm is shown, including hydraulic fracture 1900 and natural fractures 1902. In the example of FIG. 19, the characteristic mesh size of the original mesh was 250 feet and the target sizes were $\omega=3.125$ feet, $\alpha=250$ feet. That is, for this mesh, none of the levels used isotropic refinement, which resulted in $n_{ani}=6$. As shown in FIG. 19, the mesh resolution provided by the near-fracture cells is higher in the areas surrounding fractures 1900 and 1902 as compared to the areas not surrounding fractures 1900 or 1902. In FIG. 20, the model of FIG. 19 is shown with some of fractures 2000, 2002 overlaid.

Example Methods

Figure 21:
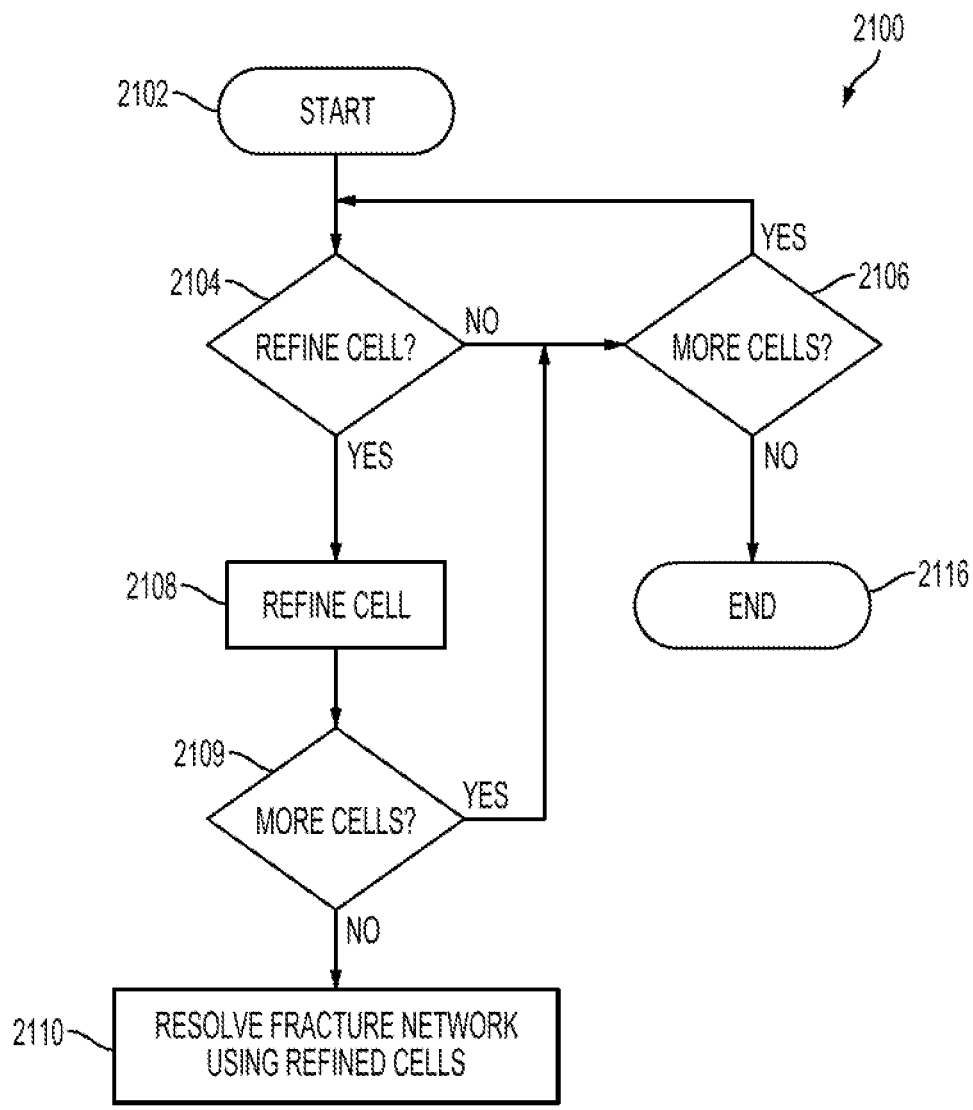
FIGS. 21 and 22 are flow charts illustrating a process for extended anisotropic, geometry-adaptive cell refinement, according to certain illustrative examples of the present disclosure.

In view of the foregoing detailed description, one illustrative method will now be described with reference to the flow charts of FIGS. 21 and 22. The methods 2100 and 2200 depicted in FIGS. 21 and 22, respectively, are described with reference to the example features of FIG. 1. However, the methods 2100 and 2200 are not limited to those example features. As shown in FIG. 21, method 2100 begins at block 2102. In one example, block 2102 includes initializing system 100 in order to generate a reservoir Earth model. During initialization, extended AGAR engine 110 uploads data from fracture system module 112 and Earth modeling module 114. Such data may include, for example, geocellular grid and fracture data. At block 2104, extended AGAR engine 110 analyzes all cells in the 3D Earth Model to determine whether cells in a mesh should be anisotropically refined (e.g., refined in any direction in the 3D space). If extended AGAR engine 110 determines the cell being analyzed does not require refinement, the control is passed to block 2106.

At block 2106, extended AGAR engine 110 then determines if there are other cells to be analyzed. If it is determined that there are no other cells to be analyzed, control is passed to block 2116 and the method 2100 completes. Otherwise, if it is determined that there is another cell remaining to be analyzed, control is passed back to block 2104 where that cell will then be analyzed to determine if refinement may be necessary.

If, at block 2104, extended AGAR engine 110 determines that the cell requires refinement, the algorithm moves onto block 2108 where that cell is refined. As previously described, gradation and intersection rules may be utilized to determine whether a cell should be refined. Once extended AGAR engine 110 refines the cells in the directions determined to be necessary, the algorithm moves onto block 2109 where a determination is made as to whether there are other cells to be analyzed. If it is determined that there are other cells to be analyzed, control is passed to block 2106. Otherwise, if it is determined that there are no other cells to be analyzed, control is passed to block 2110. At block 2110, extended AGAR engine 110 can be used to resolve the fracture network within the Earth model using the refined cells. The resulting model will possess a higher level of mesh resolution in those areas surrounding the fractures (e.g., near-fracture areas and the fractures), and lower mesh resolution in those non-near-fracture areas.

Figure 22:
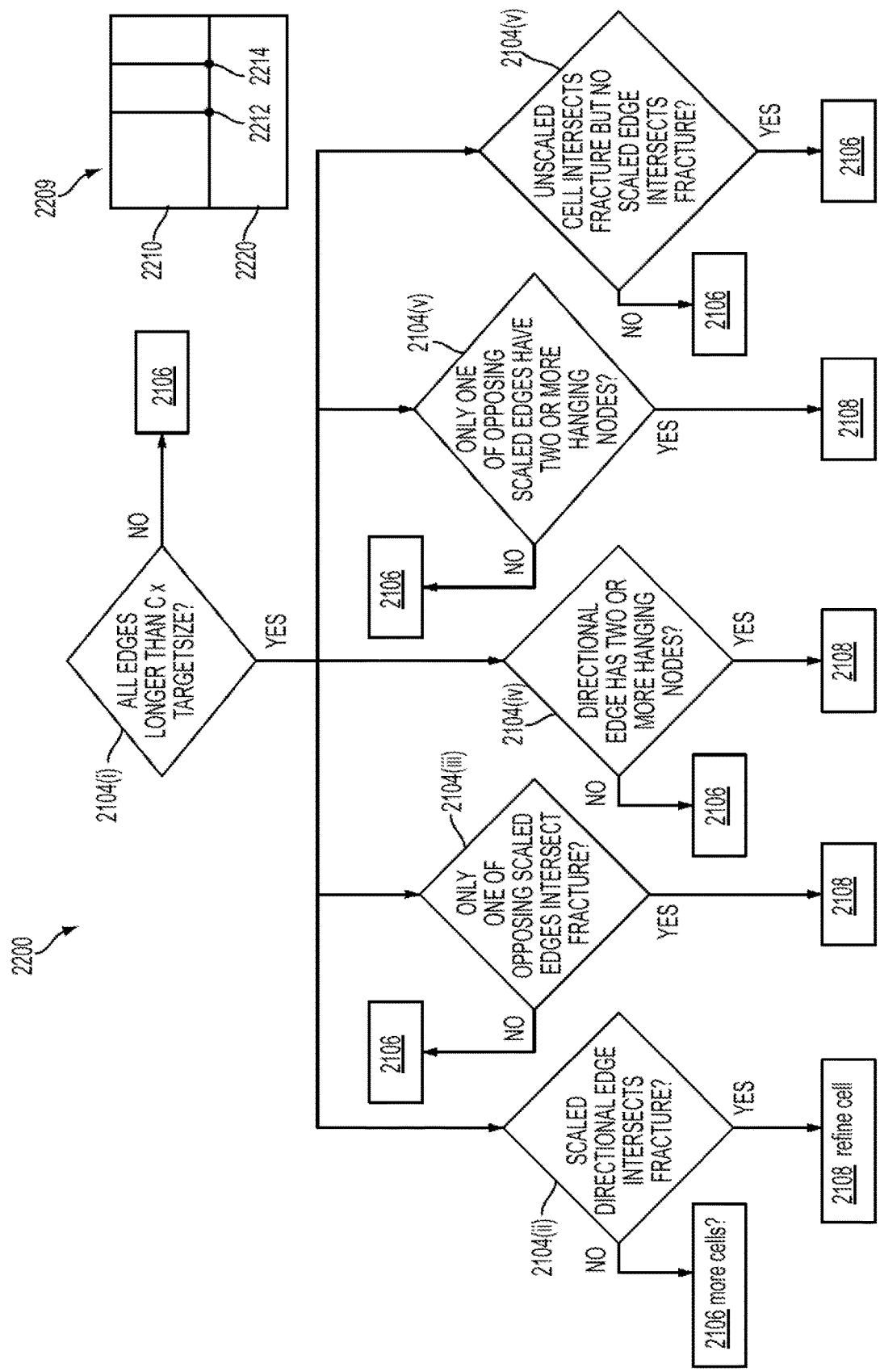

FIG. 22 is a flow chart of an illustrative refining method 2200 utilized in block 2104 discussed above with reference to FIG. 21. To begin this analysis, note that the location of fractures within the fracture system is known based upon the data received from fracture system module 112. Using this data, along with the gradation and intersection rules previously described, the extended AGAR engine 110 can locate those cells in the near-fracture regions of the model that require refinement. For those cells requiring refinement, all edges (and, thus, the cells) will be split in half in each refinement direction. The newly created cells will then be analyzed again in the next iteration, thereby ultimately increasing the mesh resolution. The resulting high resolution mesh provides more accurate numerical results in the near-fracture/fracture regions. The C×targetSize (where C=√2, e.g.) is determined as previously described above in Section A.

Nevertheless, at block 2104(i), the extended AGAR engine 110 determines whether all edges in the U-V-W directions for the cell (each direction is analyzed separately) are longer than C×targetSize. If all those edges are not longer than C×targetSize, no refinement is required, and control is passed to block 2106. If, however, all those edges are longer than C×targetSize, the five rules can then applied. At this point, at blocks 2104(ii)-(vi), extended AGAR engine 110 determines if one or more of the following are met: ii) a scaled directional edge intersects a fracture; iii) for any opposing pair of edges in the 3D direction, exactly one of the two scaled edges intersect a fracture; iv) a directional edge has two or more 'hanging' nodes; v) for any opposing pair of edges in the 3D direction, exactly one of the two edges has two or more hanging nodes; and vi) the unscaled cell intersect a fracture but no scaled edge of the cell intersects a fracture.

At block 2104(ii), with reference to FIG. 13, extended AGAR engine 110 determines if the scaled version of cell 1300 (i.e., 1300S) has an edge in the analyzed direction that intersects a fracture. At block 2104(iii), the extended AGAR engine 110 (for example) can analyze an opposing pair of edges in a given direction (e.g., edges 5 and 1 in FIG. 12), to determine if only one of the scaled edges intersects a fracture. At block 2104(iv), AGAR engine will determine if an edge in the analyzed direction has two or more hanging nodes. In FIG. 22, element 2209 is provided as an illustration of this principle. Element 2209 is described below.

As shown in FIG. 22, element 2209 includes two adjacent cell faces 2210 and 2220 (shown in 2D for simplicity) having two nodes 2212 and 2214 positioned between them. In the example of element 2209, the first refinement would have split cell 2210 in half using node 2212. The second refinement would have split one of the new cells in half using node 2214. Therefore, nodes 2212 and 2214 are 'hanging' with respect to cell 2220 because, although cell 2210 has been refined (in a previous iteration), cell 2220 has not been refined. Since cell 2220 has at least two hanging nodes, extended AGAR engine 110 will also refine it in subsequent iterations.

At block 2104(v) of process 2200, extended AGAR engine 110 analyzes opposing edge pairs in the analyzed direction to determine whether only one of the edges has two or more hanging nodes. At block 2104(vi), extended AGAR engine 110 determines whether an unscaled cell intersects a fracture but no scaled edge of the cell intersects a fracture.

If the determination is 'Yes' to any of the five rules described above with reference to blocks 2104(i-v), the method passes control to block 2108 where that cell will be refined. Otherwise, if the determination is 'No' to all of the five rules, control is passed to block 2106. This process will continue iteratively until each cell in the model has been analyzed. Once the analysis is complete, extended AGAR engine 110 will generate the Earth Model using the refined cells. The generated Earth Model may be utilized in a variety of applications, such as in a reservoir simulation. Thereafter, the reservoir simulation may be utilized to design and conduct a wellbore completion, and implement downhole operations accordingly.

Example Stadia Meshing Techniques

Figure 23:
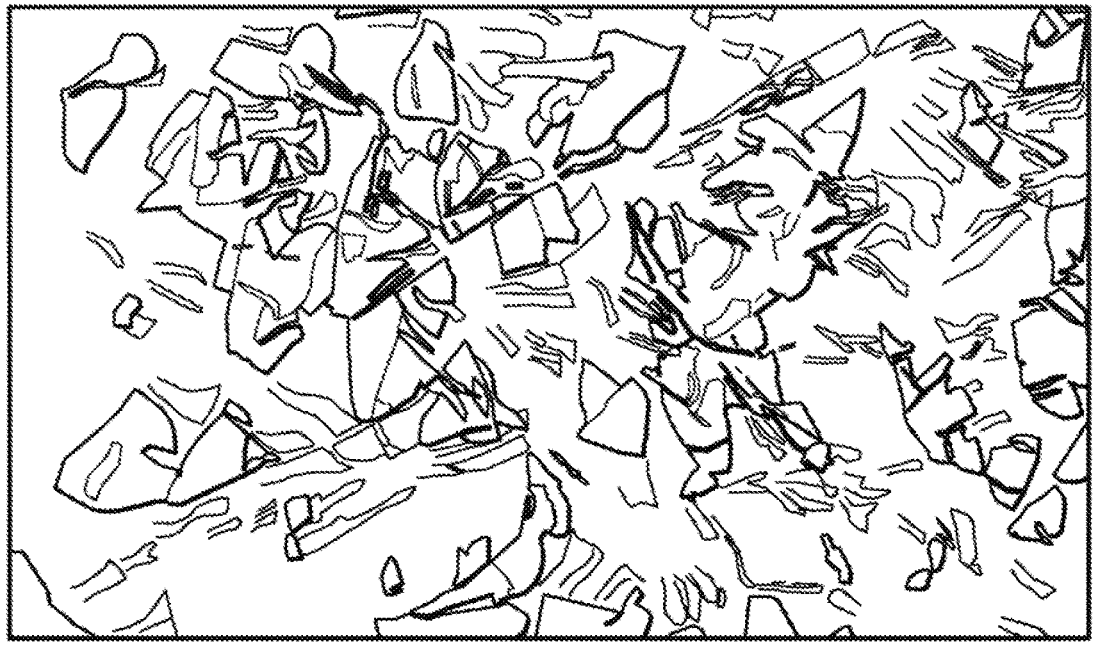
FIG. 23 illustrates an image of three-dimensional fractures modeled using certain illustrative examples of the present disclosure.

FIG. 23 illustrates an image 2300 of three-dimensional (3D) fractures that can be modeled using disclosed features. As can be seen in image 2300, the layers of earth formation includes fractures within the formation. These fractures can be described as open cracks or voids within the formation and can either be naturally occurring or artificially generated from a wellbore. Understanding and modeling the proper characteristic of these fractures is important as the fractures enables and affect the flow reservoir fluids to the well bore. Images such as image 2300 may be obtained or generated using image logs. Image logs can use a rotating transducer to measure acoustic impedance across the entire borehole wall to identify the presence and direction of rock fractures, as well as understanding the dip direction of the stratigraphy.

Figure 24:
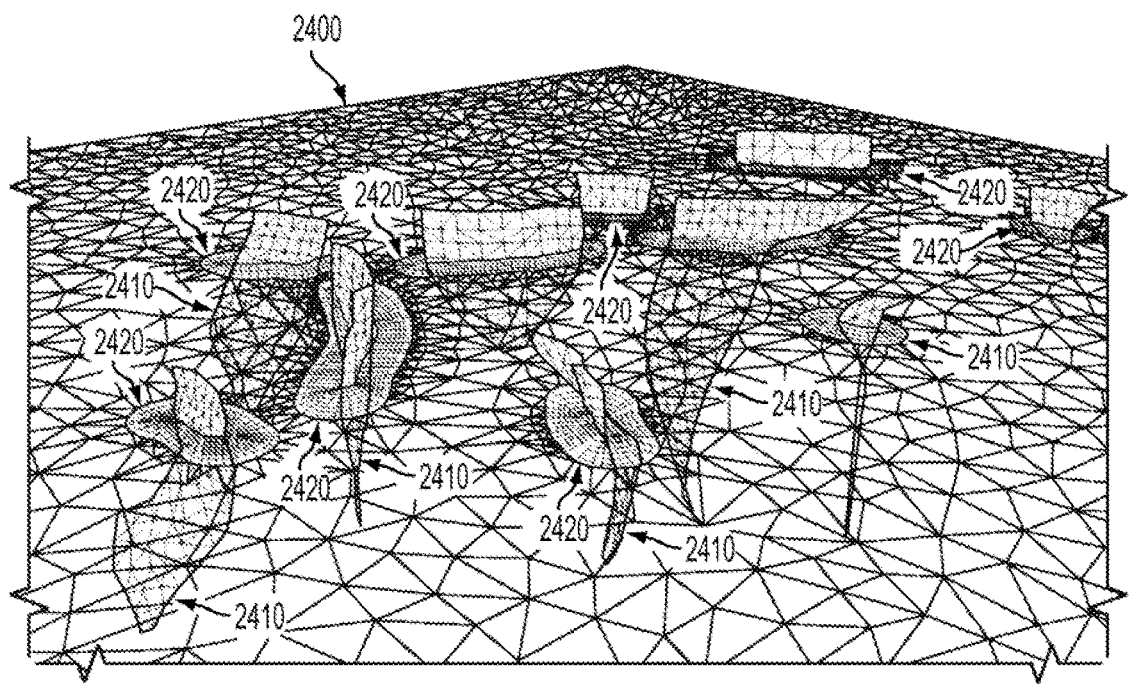
FIG. 24 illustrates an example of a set of discretized three-dimensional fractures intersecting a two dimensional plane, according to certain illustrative aspects of the present disclosure.

FIG. 24 illustrates a broad perspective of an example of a set of 3D fractures 2410 that intersect, at line segments 2420, a 2D plane 2400. As can be seen in FIG. 24, a set of closed loop stadia may be generated around each of the line segments 2420 and a constrained mesh fills the remaining space of the 2D plane 2400. The set of closed loop stadia can be generated using the process 2500 described below with reference to FIG. 25.

Figure 25:
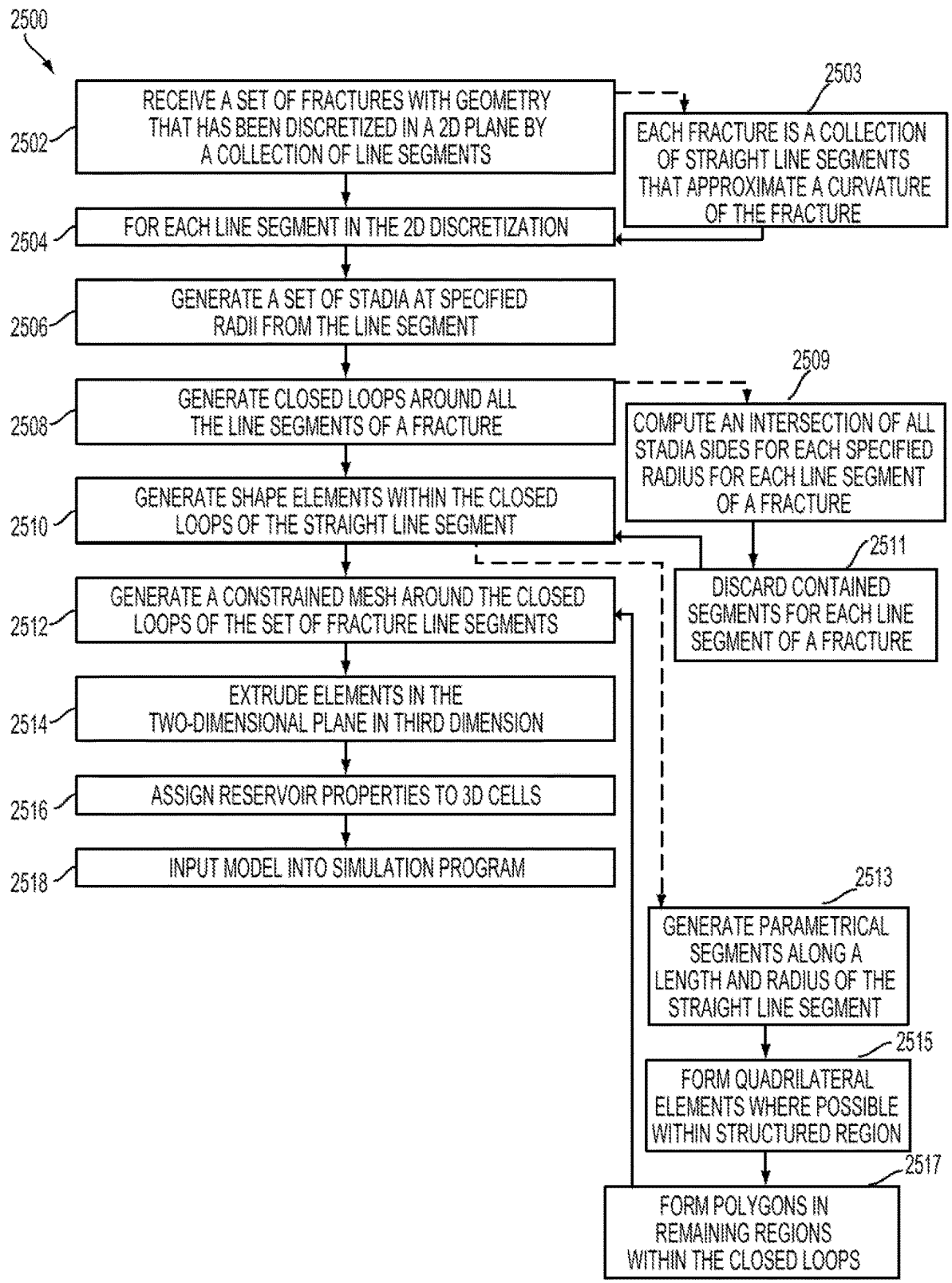
FIG. 25 is a flowchart of a process for modeling three-dimensional fractures, according to certain illustrative examples of the present disclosure.

FIG. 25 is a flow chart depicting a process 2500 for modeling 3D fractures using a 2.5D stadium mesher. The process 2500 begins at block 2502 by receiving a set of fractures with geometry that has been discretized in a 2D plane by a collection of line segments. In an alternative, the process 2500 may begin by performing the discretization of a set of fractures in a 2D plane by a collection of line segments. The collection of line segments can represent the intersection between the 2D plane and the 3D geological fractures. As shown in block 2503, each fracture can be represented by a collection of straight line segments to approximate a curvature of the fracture.

In accordance with an example, at block 2504, for each fracture line segment in the 2D plane, the process 2500 performs block 2506 to generate a set of stadia at a specified radii from the respective fracture line segment. Then, at block 2508, process 2500 then generates closed loops around all of the line segments of a fracture. In certain embodiments, block 2508 includes a process of generating the closed loops around line segments of the fracture. This can include computing an intersection of all stadia sides for each specified radius for each line segment of the fracture, as shown at block 2509 in FIG. 25, and discarding the contained segments for each straight line segment in each fracture line segment that are wholly contained by stadia of other line segments in the fracture line segment, as shown at block 2511.

After completing block 2508 (and optional blocks 2509 and 2511 in certain embodiments), the process 2500 proceeds to block 2510. At block 2510, shape elements may be generated within the closed loops of the straight line segment. For example, in one embodiment, the process 2500 generates parametrical segments along a length and radius of each straight line segment, as shown in block 2513.

The process 2500 then forms quadrilateral elements where possible within the structured region at block 2515, and forms polygons within the remaining regions of the closed loops at block 2517.

After generating the shape elements, the process 2500 can generate a constrained mesh around the closed loops of the set of fracture line segments, filling the remainder of the 2D plane at block 2512). In one embodiment, a Delaunay triangulation algorithm can be utilized to generate the constrained mesh around the closed loops of the set of fracture line segments. Thus, the 2D plane now consists entirely of cell elements of the fracture line segments and the constrained mesh.

At this point, the process 2500 can extrude each of the cells in the 2D plane to a third dimension for creating one or more layers of 3D cells. The cells within a closed loop of a fracture line segment can represent a 3D fracture, whereas the cells within the mesh can represent rock layers encompassing the fractures. Thus, the process 2500 can assign reservoir properties such as, but not limited to, porosity and permeability, to each of the 3D cells for modeling the fluid flow of the reservoir, as shown at block 2516. Finally, the process 2500 can input the 3D cellular model into a simulation program, such as, but not limited to, Nexus® reservoir simulation software, for performing numerical simulation and for assessing the fluid flow, as shown at block 2518).

Figure 26:
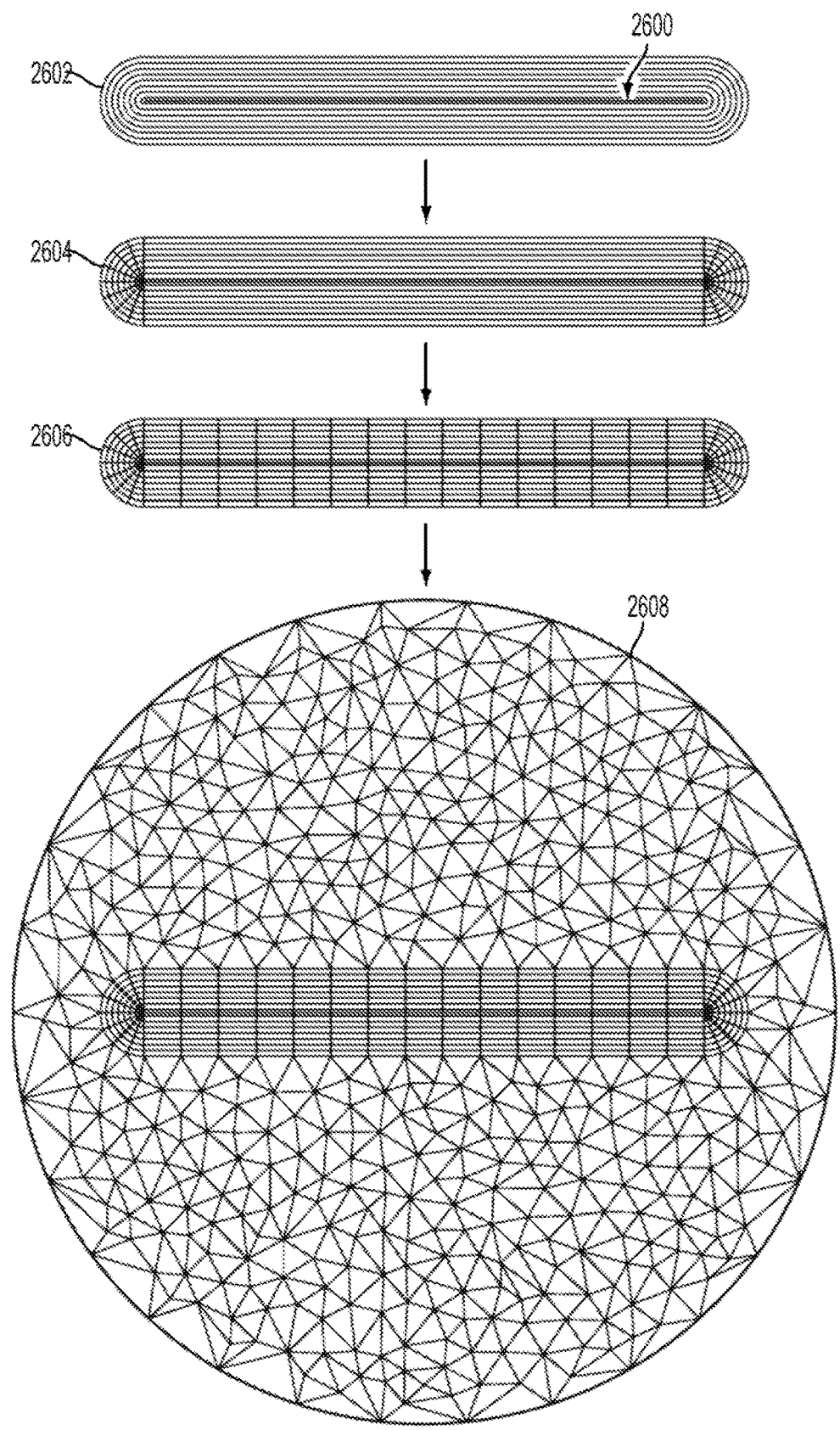
FIG. 26 is an illustration of generating a computational mesh around a fracture line segment, according to certain illustrative features of the present disclosure.

FIG. 26 provides a closer view of the process 2500 by illustrating an example for generating a computational mesh around a single fracture line segment in accordance with the disclosed embodiments. Beginning with diagram 2602, a set of stadia is generated around a line segment 2600. As can be seen by diagram 2602, each stadium in the set of stadia consists of two linear sides connected by two arcs to completely enclose the straight line segment. The distance from each side to the straight line segment is a constant radius. In certain embodiments, the radius distance may be user modifiable variable value.

In diagram 2604, parametrical segments along a length and radius of each straight line segment is generated in accordance with block 2513 of the process 2500. Quadrilateral elements may be then formed where possible within the structured region as referenced in block 2513 of the process 2500. Diagram 2608 illustrates the constrained mesh generated around the closed loops of the line segment 2600.

Figure 27:
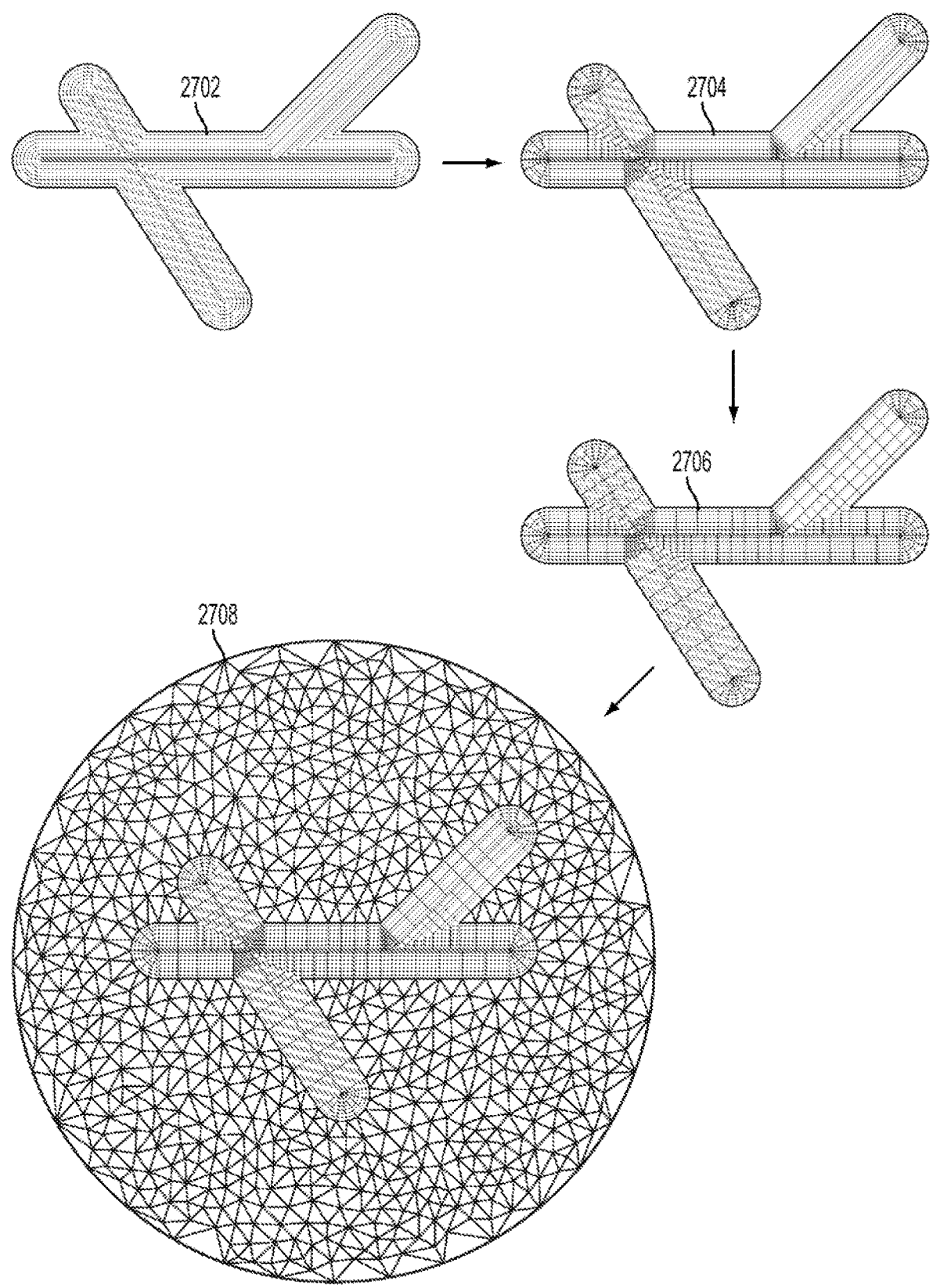
FIG. 27 is an illustration of generating computational meshes around intersecting fracture line segments, according to certain illustrative examples of the present disclosure.

FIG. 27 provides another close-up view of the process 2500 by illustrating an example of generating computational meshes around intersecting fracture line segments. For instance, diagram 2702 illustrates a set of stadia generated around three intersecting fracture line segments. The result of diagram 2702 required that the process compute an intersection of all stadia sides for each specified radius for each of the intersecting fracture line segment as referenced in block 2509 and discard the contained segments for each fracture line segment that are wholly contained by stadia of other fracture 27 line segments as referenced in block 2511.

Diagram 2704 illustrates the results of generating shape elements within the closed loops of the fracture line segments as referenced in block 2510 of FIG. 25. As can be seen, parametrical segments along a length and radius of each fracture line segment is generated in accordance with block 2513 of FIG. 25. Quadrilateral elements can then formed where possible within the structured region as referenced in block 2515 as illustrated in diagram 2706. In addition, polygons may be formed within the remaining regions of the closed loops of the fracture line segments as indicated at block 2517 of FIG. 25. Diagram 2708 illustrates a constrained mesh generated around the closed loops of the intersecting fracture line segments as referenced in block 2512 of process 2500.

Figure 28:
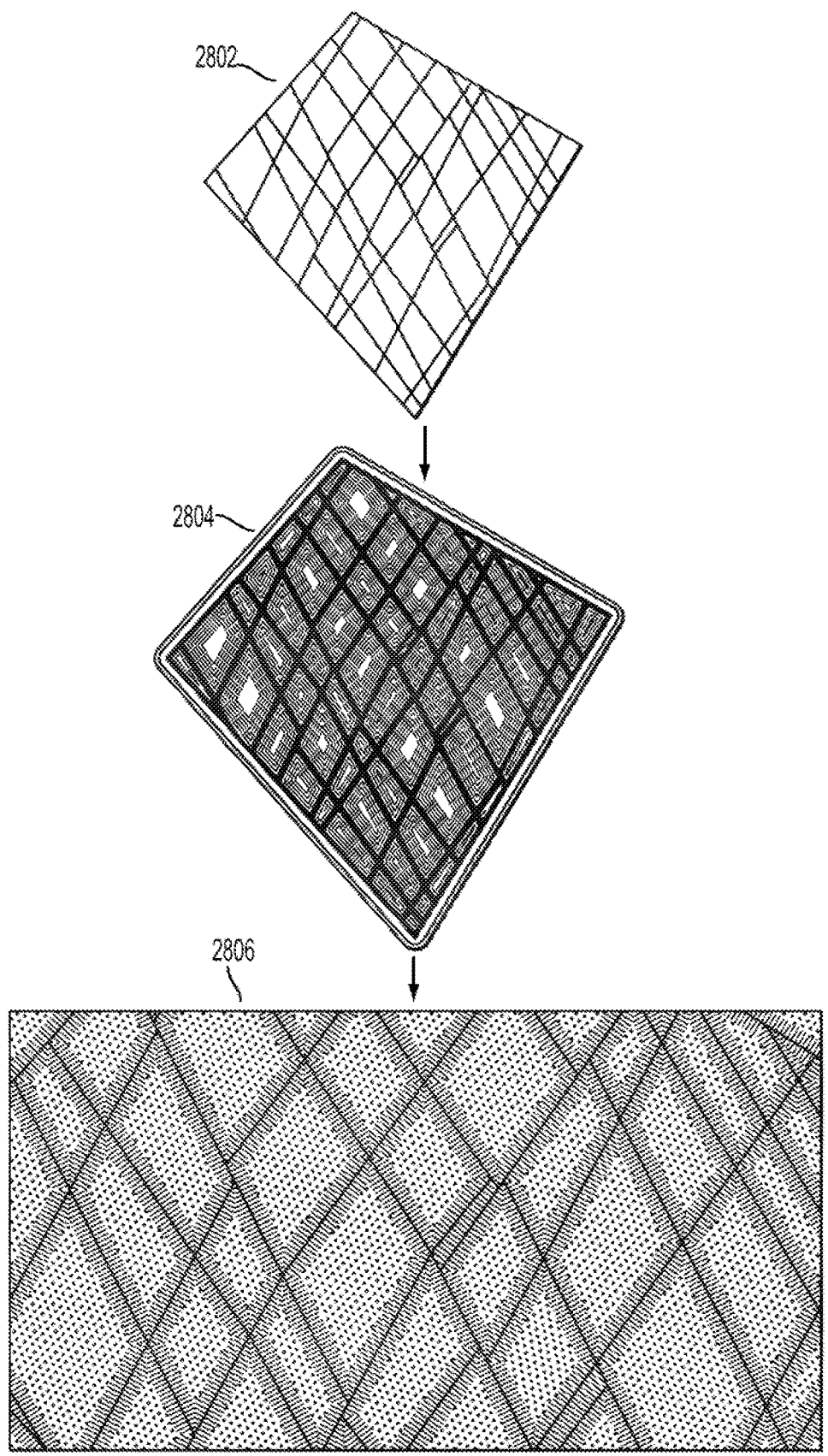
FIG. 28 illustrates an example of computational meshes around a complex array of fracture line segments, according to certain illustrative examples of the present disclosure.

FIG. 28 illustrates an example of computational meshes being generated around a complex array of fracture line segments. In particular, diagram 2802 indicates a set of fractures with geometry that has been discretized in a 2D plane by a collection of line segments. Diagram 2804 illustrates the results of a set of stadia being generated around each of the fracture line segments. Diagram 2806 illustrates an exploded view of the fracture line segments as a result of performing the remaining process 2500 described above with reference to FIG. 25.

As shown in FIG. 28, the disclosed algorithm can quickly generate unstructured grids using structured elements around complex geometries. The cells in the 2D plane shown in FIG. 28 may then be extruded in a third dimension to form layers of 3D cells. The 3D cells can then be assigned reservoir properties for enabling numeric simulation.

Figure 29:
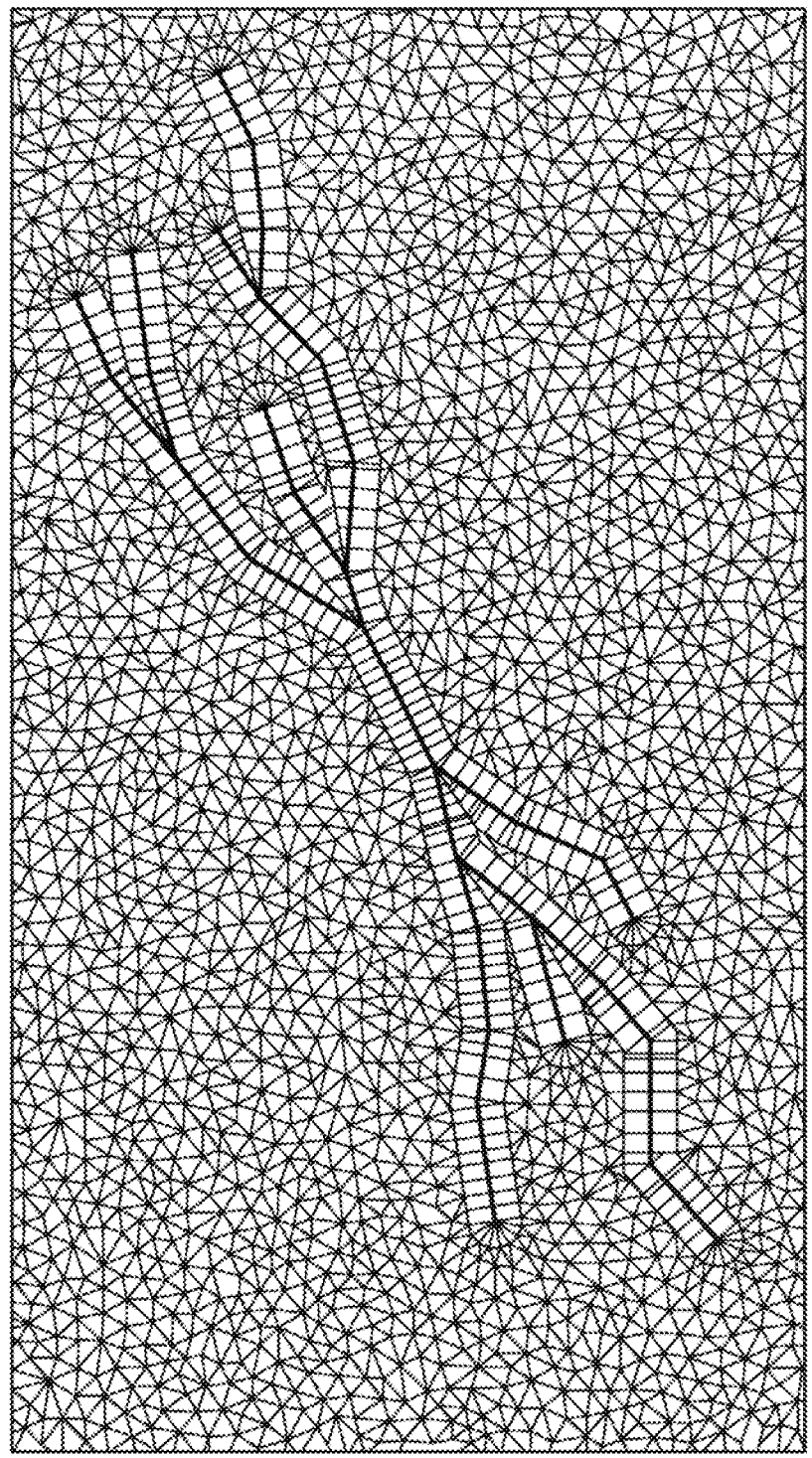
FIG. 29 illustrates an unstructured grid generated around complex geometries that include intersecting fracture line segments, according to certain illustrative examples of the present disclosure.

As another example, FIG. 29 provides an illustration 2900 of complex geometries involving a plurality of intersecting fracture line segments in which certain embodiments may quickly generate a two-dimensional grid cell that may be extruded into three-dimensional elements for performing numeric simulations.

Example Computer System Implementation

Figure 30:
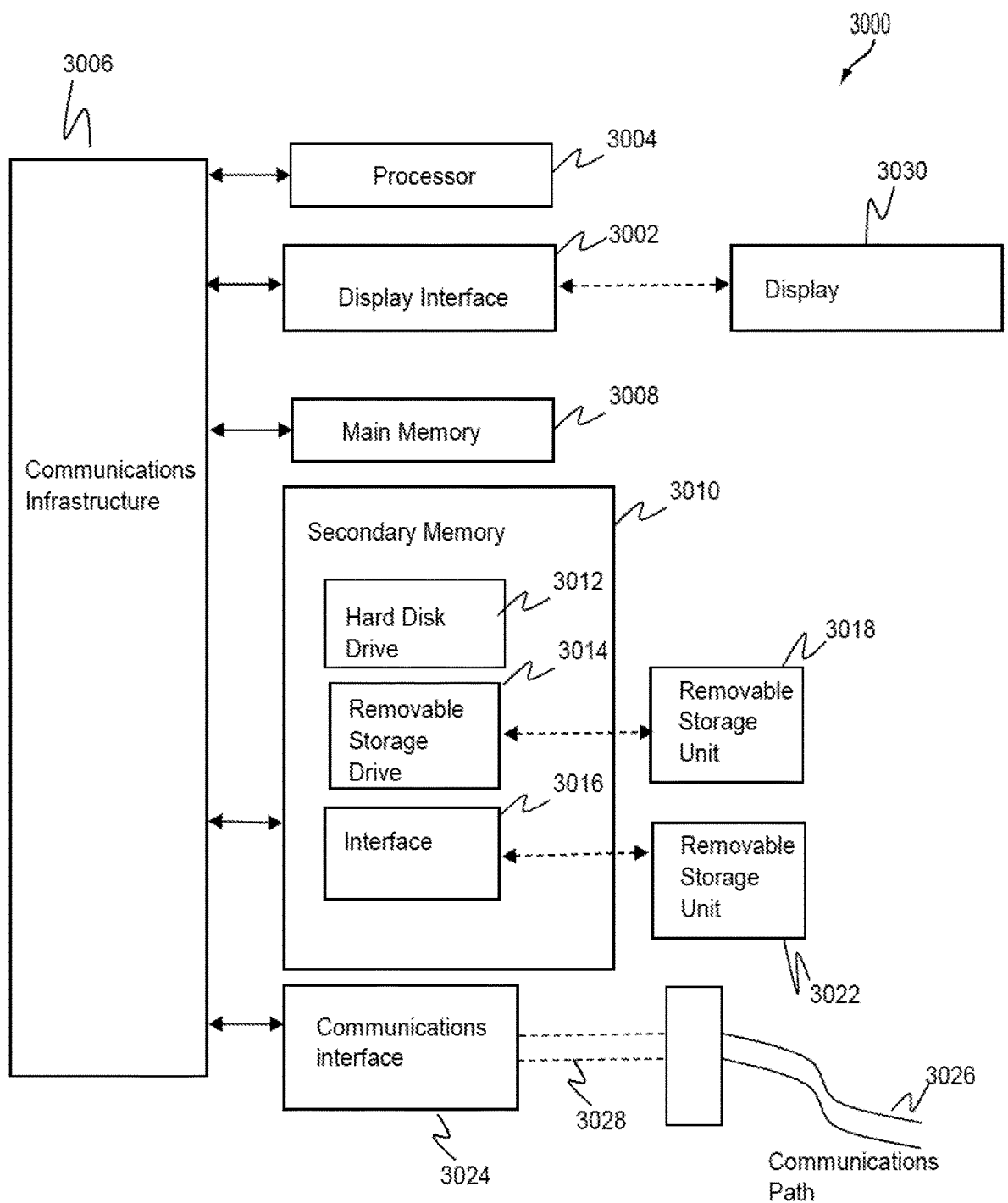
FIG. 30 is a diagram of an example of a computer system in which certain embodiments of the present disclosure can be implemented.

Although examples of embodiments have been described in terms of apparatuses, systems, services, and methods, it is contemplated that certain functionality described herein may be implemented in software on microprocessors, such as a microprocessor chip included in computing devices such as the computer system 3000 illustrated in FIG. 30. In various embodiments, one or more of the functions of the various components may be implemented in software that controls a computing device, such as computer system 3000, which is described below with reference to FIG. 30.

To implement the various features and functions described above, some or all elements of the systems (e.g., system 100 of FIG. 1), workflows, and methods (e.g., processes 200, 2100, and 2500 of FIGS. 2, 21, and 25) may be implemented using elements of the computer system of FIG. 30. More particularly, FIG. 30 illustrates an example computer system 3000 for implementing the techniques in accordance with the present disclosure.

Aspects of the present disclosure shown in FIGS. 1-28, or any part(s) or function(s) thereof, may be implemented using hardware, software modules, firmware, tangible computer readable media having logic or instructions stored thereon, or a combination thereof and may be implemented in one or more computer systems or other processing systems.

FIG. 30 illustrates an example computer system 3000 in which embodiments of the present disclosure, or portions thereof, may be implemented as computer-readable instructions or code. For example, some functionality performed by the system 100 shown in FIG. 1 can be implemented in the computer system 3000 using hardware, software, firmware, non-transitory computer readable media having instructions stored thereon, or a combination thereof and may be implemented in one or more computer systems or other processing systems. Hardware, software, or any combination of such may embody certain modules and components used to implement the system 100 and workflow 200 illustrated by FIGS. 1 and 2 discussed above. Similarly, hardware, software, or any combination of such may embody certain modules and components used to implement steps in the flowcharts illustrated by FIGS. 21, 22, and 25 discussed above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Certain embodiments are described in terms of this example computer system 3000. After reading this description, it will become apparent to a person skilled in the relevant art how to implement the disclosed examples using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 3004 may be a special purpose or a general purpose processor device. As will be appreciated by persons skilled in the relevant art, processor device 3004 may also be a single processor in a multi-core/multiprocessor system, such system operating alone, or in a cluster of computing devices operating in a cluster or server farm. Processor device 3004 is connected to a communication infrastructure 3006, for example, a bus, message queue, network, or multi-core message-passing scheme. In one embodiment, system bus 109 of system 100 described above with reference to FIG. 1 can be embodied as the communication infrastructure 3006 shown in FIG. 30. According to an embodiment, processor 102 of system 100 described above with reference to FIG. 1 can be embodied as the processor device 3004 shown in FIG. 30.

Computer system 3000 also includes a main memory 3008, for example, random access memory (RAM), and may also include a secondary memory 3010. Secondary memory 3010 may include, for example, a hard disk drive 3012, removable storage drive 3014. Removable storage drive 3014 may include a floppy disk drive, a magnetic tape drive, an optical disk drive, a flash memory, or the like. In a non-limiting embodiment, the storage 104 of system 100 of FIG. 1 can be embodied as the main memory 3008 shown in FIG. 30.

The removable storage drive 3014 reads from and/or writes to a removable storage unit 3018 in a well known manner. Removable storage unit 3018 may include a floppy disk, magnetic tape, optical disk, etc., which is read by and written to by removable storage drive 3014. As will be appreciated by persons skilled in the relevant art, removable storage unit 3018 includes a non-transitory computer readable storage medium having stored therein computer software and/or data.

In alternative implementations, secondary memory 3010 may include other similar means for allowing computer programs or other instructions to be loaded into computer system 3000. Such means may include, for example, a removable storage unit 3022 and an interface 3020. Examples of such means may include a program cartridge and cartridge interface (such as that found in video game devices), a removable memory chip (such as an EPROM, or EEPROM) and associated socket, and other removable storage units 3022 and interfaces 3020 that allow software and data to be transferred from the removable storage unit 3022 to computer system 3000.

Computer system 3000 may also include a communications interface 3024. Communications interface 3024 allows software and data to be transferred between computer system 3000 and external devices. Communications interface 3024 may include a modem, a network interface (such as an Ethernet card), a communications port, a PCMCIA slot and card, or the like. Software and data transferred via communications interface 3024 may be in the form of signals, which may be electronic, electromagnetic, optical, or other signals capable of being received by communications interface 3024. These signals may be provided to communications interface 3024 via a communications path 3026. Communications path 3026 carries signals and may be implemented using wire or cable, fiber optics, a phone line, a cellular phone link, an RF link or other communications channels.

As used herein the terms 'computer readable medium' and 'non-transitory computer readable medium' are used to generally refer to media such as memories, such as main memory 3008 and secondary memory 3010, which can be memory semiconductors (e.g., DRAMs, etc.). Computer readable medium and non-transitory computer readable medium can also refer to removable storage unit 3018, removable storage unit 3022, and a hard disk installed in hard disk drive 3012. Signals carried over communications path 3026 can also embody the logic described herein. These computer program products can be means for providing software to computer system 3000.

Computer programs (also called computer control logic) may be stored in main memory 3008 and/or secondary memory 3010. Computer programs may also be received via communications interface 3024. Such computer programs, when executed, enable computer system 3000 to implement the present examples as discussed herein. In particular, the computer programs, when executed, enable processor device 3004 to implement the processes of the present disclosure, such as the steps in the workflow illustrated in FIG. 2 and the methods illustrated by the flowcharts of FIGS. 21, 22, and 25, discussed above. Accordingly, such computer programs represent controllers of the computer system 3000. Where features are implemented using software, the software may be stored in a computer program product and loaded into computer system 3000 using removable storage drive 3014, interface 3020, and hard disk drive 3012, or communications interface 3024.

In certain embodiments, one or more of the display device 108 of system 100 and displays used to display the user interfaces shown in FIGS. 8 and 9 be a computer display 3030 shown in FIG. 30. The computer display 3030 of computer system 3000 can be implemented as a touch sensitive display (i.e., a touch screen). The computer display 3030 can connect to communications infrastructure via display interface 3002 to display received electronic content. For example, the computer display 3030 can be used to display input models and refined fractures. Also, for example, computer display 3030 can be used to display the user interfaces 800 and 900 shown in FIGS. 8 and 9.

Some embodiments may also be directed to computer program products including software stored on any computer useable medium. Such software, when executed in one or more data processing device, causes a data processing device(s) to operate as described herein. Certain embodiments employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Examples of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Additionally, the use of "based on" is meant to be open and inclusive, in that a process, step, calculation, or other action "based on" one or more recited conditions or values may, in practice, be based on additional conditions or values beyond those recited.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

Embodiments and methods described herein further relate to any one or more of the following paragraphs. As used below, any reference to a series of examples is to be understood as a reference to each of those examples disjunctively (e.g., "Examples 1-4" is to be understood as "Examples 1, 2, 3, or 4").

Example 1 is a computer-implemented method that includes receiving, at a computing device, a reservoir specification. The method identifies, based on the reservoir specification, a set of fractures including: 2.5 dimensional (2.5D)-permitting fractures; and other fractures. The method further includes generating an intermediate reservoir model including an extrusion mesh which models the 2.5D-permitting fractures in a three-dimensional (3D) space. In response to determining that cells in the mesh should be refined in a direction within the 3D space, the method anisotropically refines cells in the mesh corresponding to the other fractures. The method also includes resolving, by the computing device, a fracture network within the intermediate reservoir model using the refined cells; and generating a reservoir earth model using the fracture network.

Example 2 is the method of Example 1, where the 2.5D-permitting fractures have geometry that has been discretized in a two-dimensional (2D) plane by a collection of line segments, and where generating the intermediate reservoir model comprises, for each line segment associated with each fracture in the 2.5D-permitting fractures: generating a set of stadia at a specified radii from the line segment; generating closed loops around all of the line segments associated with a 2.5D-permitting fracture; and generating shape elements within the closed loops of the line segment. In Example 2, the method further includes generating the mesh as a constrained mesh around closed loops of the 2.5D-permitting fractures to fill in a remainder space of the 2D plane.

Example 3 is the method of Examples 1 or 2 where the method further includes utilizing the reservoir earth model in a reservoir simulation, and then displaying the reservoir simulation on a display of the computing device.

Example 4 is the method of Examples 1-3, where: the 2.5D-permitting fractures include fractures represented by one or more substantially vertical planes; and the other fractures include fractures represented by one or more substantially horizontal planes.

Example 5 is the method of Examples 1-4, where anisotropically refining cells in the mesh includes identifying a direction within the 3D space in which the cells should be refined, and splitting an edge of the cells, the edge being in the direction within the 3D space.

Example 6 is the method of Example 5, where the edge is split along a plane that is perpendicular to an axis of a fracture within the fracture network.

Example 7 is the method of Examples 1-6, where anisotropically refining the cells includes: determining a location of a fracture within the intermediate reservoir model; identifying cells in a near-fracture region; determining a target size of edges of the near-fracture cells; and determining whether edges of the near-fracture cells in the direction within the 3D space are longer than the target size times a scalar variable. The near-fracture cells have edges in the direction within the 3D space which are longer than the target size times the scalar variable are among the cells which are refined.

Example 8 is the method of Example 7, where determining the location of the fracture includes scaling the edges of near-fracture cells which are longer than the target size times the scalar variable, and determining if the scaled edges intersect the fracture. The near-fracture cells have scaled edges that intersect the fracture are the cells which are refined.

Example 9 is the method of Examples 7 or 8, where determining the location of the fracture also includes scaling the edges of near-fracture cells which are longer than the target size times the scalar variable, and for any opposing pair of the scaled edges, determining whether exactly one of the two scaled edges intersect the fracture. The near-fracture cells have exactly one scaled edge intersecting the fracture are the cells which are refined.

Example 10 is the method of Examples 7-9, where determining the location of the fracture further includes determining whether the edges of near-fracture cells which are longer than the target size times the scalar variable have two or more hanging nodes, and where the near-fracture cells having the two or more hanging nodes are refined.

Example 11 is the method of Examples 7-10, where anisotropically refining cells in the mesh also includes, for any opposing pair of the edges of near-fracture cells which are longer than the target size times the scalar variable, determining whether exactly one of the two edges has two or more hanging nodes, and where the near-fracture cells having the two or more hanging nodes are refined.

Example 12 is the method of Example 11, where anisotropically refining cells in the mesh also includes scaling the edges of near-fracture cells which are longer than a the target size times the scalar variable, and determining whether the near-fracture cells having scaled edges intersect a fracture while no unscaled near-fracture cells intersect a fracture. The near-fracture cells having scaled edges intersecting the fracture are refined.

Example 13 is the method of Examples 7-11, where anisotropically refining cells in the mesh further includes: determining a location of a fracture within the intermediate reservoir model; identifying cells in a near-fracture region; identifying a direction within the 3D space in which the near-fracture cells should be refined; and determining whether the near-fracture cells having an edge in the identified direction also have no more than one hanging node. The near-fracture cells having no more than one hanging node are refined.

Example 14 is the method of Examples 7-11, where anisotropically refining cells in the mesh also includes: determining a location of a fracture within the intermediate reservoir model; identifying cells in a near-fracture region; and for any opposing pair of near-fracture cell edges, determining whether exactly one of the two opposing edges has two or more hanging nodes. The near-fracture cells having the two or more hanging nodes are refined.

Example 15 is a computer readable storage medium that has executable instructions stored thereon. If the instructions are executed by a computing device, the instructions cause the computing device to perform operations. The instructions include: instructions for receiving a reservoir specification. The instructions also include instructions for identifying, based on the reservoir specification, a set of fractures including 2.5 dimensional (2.5D)-permitting fractures, and other fractures. The instructions further include instructions for generating an intermediate reservoir model including an extrusion mesh which models the 2.5D-permitting fractures in a three-dimensional (3D) space. In response to determining that cells in the mesh should be refined in a direction within the 3D space, the instructions include instructions for anisotropically refining cells in the mesh corresponding to the other fractures. The instructions additionally include instructions for resolving a fracture network within the intermediate reservoir model using the refined cells, and instructions for generating a reservoir earth model using the fracture network.

Example 16 is the storage medium of Example 15, where the instructions for anisotropically refining cells in the mesh include instructions for identifying a direction within the 3D space in which the cells should be refined, and instructions for splitting an edge of the cells, the edge being in the direction within the 3D space.

Example 17 is the storage medium of Examples 15 or 16, where the 2.5D-permitting fractures include fractures represented by one or more substantially vertical planes, and where the other fractures include fractures represented by one or more substantially horizontal planes.

Example 18 is a system that includes a processor, a display device, and a memory having instructions stored thereon, that, if executed by the processor, cause the processor to perform operations. The operations include receiving a reservoir specification and identifying, based on the reservoir specification, a set of fractures including 2.5 dimensional (2.5D)-permitting fractures, and other fractures. The operations also include generating an intermediate reservoir model including an extrusion mesh which models the 2.5D-permitting fractures in a three-dimensional (3D) space. Responsive to determining that cells in the mesh should be refined in a direction within the 3D space, the operations include anisotropically refining cells in the mesh corresponding to the other fractures. The operations further include resolving a fracture network within the intermediate reservoir model using the refined cells, and then generating a reservoir earth model using the fracture network.

Example 19 is the system of Example 18, where the 2.5D-permitting fractures include fractures represented by one or more vertical planes, and the other fractures include fractures represented by one or more horizontal planes.

Example 20 is the system of Examples 18 or 19, where the operations further include displaying the reservoir earth model on the display device.

What is claimed is:

1. A computer-implemented method comprising:
   receiving, at a computing device, a reservoir specification;
   identifying, based on the reservoir specification, a set of fractures including:
      2.5 dimensional (2.5D)-permitting fractures; and
      other fractures;
   generating an intermediate reservoir model including an extrusion mesh which models the 2.5D-permitting fractures in a three-dimensional (3D) space;
   responsive to determining that cells in the extrusion mesh should be refined in a direction within the 3D space, anisotropically refining cells in the extrusion mesh corresponding to the other fractures, wherein anisotropically refining the cells comprises:
      determining a location of a fracture within the intermediate reservoir model;
      identifying cells in a near-fracture region;
      determining a target size of edges of the near-fracture cells; and
      determining whether edges of the near-fracture cells in the direction within the 3D space are longer than the target size times a scalar variable, the near-fracture cells having edges in the direction within the 3D space which are longer than the target size times the scalar variable being among the cells which are refined;
   resolving, by the computing device, a fracture network within the intermediate reservoir model using the refined cells; and
   generating a reservoir earth model using the fracture network.

2. The computer-implemented method of claim 1, wherein the 2.5D-permitting fractures have geometry that has been discretized in a two-dimensional (2D) plane by a collection of line segments, and wherein generating the intermediate reservoir model comprises, for each line segment associated with each fracture in the 2.5D-permitting fractures:
   generating a set of stadia at a specified radii from the line segment;
   generating closed loops around all of the line segments associated with a 2.5D-permitting fracture; and
   generating shape elements within the closed loops of the line segments, the method further comprising:
   generating the extrusion mesh as a constrained mesh around closed loops of the 2.5D-permitting fractures to fill in a remainder space of the 2D plane.

3. The computer-implemented method of claim 1, further comprising:
   utilizing the reservoir earth model in a reservoir simulation; and
   displaying the reservoir simulation on a display of the computing device.

4. The computer-implemented method of claim 1, wherein:
   the 2.5D-permitting fractures include fractures represented by one or more substantially vertical planes; and
   the other fractures include fractures represented by one or more substantially horizontal planes.

5. The computer-implemented method of claim 1, wherein anisotropically refining cells in the extrusion mesh comprises:
   identifying a direction within the 3D space in which the cells should be refined; and
   splitting an edge of the cells, the edge being in the direction within the 3D space.

6. The computer-implemented method of claim 5, wherein the edge is split along a plane that is perpendicular to an axis of a fracture within the fracture network.

7. The computer-implemented method of claim 1, wherein determining the location of the fracture comprises:
   scaling the edges of near-fracture cells which are longer than the target size times the scalar variable; and
   determining if the scaled edges intersect the fracture,
   wherein the near-fracture cells having scaled edges that intersect the fracture are the cells which are refined.

8. The computer-implemented method of claim 1, wherein determining the location of the fracture further comprises:
   scaling the edges of near-fracture cells which are longer than the target size times the scalar variable; and
   for any opposing pair of the scaled edges, determining whether exactly one of the two scaled edges intersect the fracture,
   wherein the near-fracture cells having exactly one scaled edge intersecting the fracture are the cells which are refined.

9. The computer-implemented method of claim 1, wherein determining the location of the fracture further comprises:
    determining whether the edges of near-fracture cells which are longer than the target size times the scalar variable have two or more hanging nodes,
    wherein the near-fracture cells having the two or more hanging nodes are refined.

10. The computer-implemented method of claim 1, wherein anisotropically refining cells in the extrusion mesh further comprises, for any opposing pair of the edges of near-fracture cells which are longer than the target size times the scalar variable, determining whether exactly one of the two opposing edges has two or more hanging nodes, wherein the near-fracture cells having the two or more hanging nodes are refined.

11. The computer-implemented method of claim 10, wherein anisotropically refining cells in the extrusion mesh further comprises:
    scaling the edges of near-fracture cells which are longer than the target size times the scalar variable; and
    determining whether the near-fracture cells having scaled edges intersect a fracture while no unscaled near-fracture cells intersect a fracture,
    wherein the near-fracture cells having scaled edges intersecting the fracture are refined.

12. The computer-implemented method of claim 1, wherein anisotropically refining cells in the extrusion mesh further comprises:
    determining a location of a fracture within the intermediate reservoir model;
    identifying cells in a near-fracture region;
    identifying a direction within the 3D space in which the near-fracture cells should be refined; and
    determining whether the near-fracture cells having an edge in the identified direction also have no more than one hanging node,
    wherein those near-fracture cells having no more than one hanging node are refined.

13. The computer-implemented method of claim 1, wherein anisotropically refining cells in the extrusion mesh further comprises:
    determining a location of a fracture within the intermediate reservoir model;
    identifying cells in a near-fracture region; and
    for any opposing pair of near-fracture cell edges, determining whether exactly one of the two opposing edges has two or more hanging nodes,
    wherein the near-fracture cells having the two or more hanging nodes are refined.

14. A non-transitory computer-readable storage medium comprising instructions that are executable by a computing device for causing the computing device to:
    receive a reservoir specification;
    identify, based on the reservoir specification, a set of fractures including:
        2.5 dimensional (2.5D)-permitting fractures; and
        other fractures;
    generate an intermediate reservoir model including an extrusion mesh which models the 2.5D-permitting fractures in a three-dimensional (3D) space;
    responsive to determining that cells in the extrusion mesh should be refined in a direction within the 3D space, anisotropically refine cells in the extrusion mesh corresponding to the other fractures, wherein anisotropically refining the cells comprises:
        determining a location of a fracture within the intermediate reservoir model;
        identifying cells in a near-fracture region;
        determining a target size of edges of the near-fracture cells; and
        determining whether edges of the near-fracture cells in the direction within the 3D space are longer than the target size times a scalar variable, the near-fracture cells having edges in the direction within the 3D space which are longer than the target size times the scalar variable being among the cells which are refined;
    resolve a fracture network within the intermediate reservoir model using the refined cells; and
    generate a reservoir earth model using the fracture network.

15. The non-transitory computer-readable storage medium of claim 14, further comprising instructions that are executable by the computing device for causing the computing device to for anisotropically refine cells in the extrusion mesh by:
    identifying a direction within the 3D space in which the cells should be refined; and
    splitting an edge of the cells, the edge being in the direction within the 3D space.

16. The non-transitory computer-readable storage medium of claim 14, wherein:
    the 2.5D-permitting fractures include fractures represented by one or more substantially vertical planes; and
    the other fractures include fractures represented by one or more substantially horizontal planes.

17. A system comprising:
    a processor;
    a display device; and
    a memory having instructions that are executable by the processor to cause the processor to perform operations comprising:
        receiving a reservoir specification;
        identifying, based on the reservoir specification, a set of fractures including:
            2.5 dimensional (2.5D)-permitting fractures; and
            other fractures;
        generating an intermediate reservoir model including an extrusion mesh which models the 2.5D-permitting fractures in a three-dimensional (3D) space;
        responsive to determining that cells in the extrusion mesh should be refined in a direction within the 3D space, anisotropically refining cells in the extrusion mesh corresponding to the other fractures, wherein anisotropically refining the cells comprises:
            determining a location of a fracture within the intermediate reservoir model;
            identifying cells in a near-fracture region;
            determining a target size of edges of the near-fracture cells; and
            determining whether edges of the near-fracture cells in the direction within the 3D space are longer than the target size times a scalar variable, the near-fracture cells having edges in the direction within the 3D space which are longer than the target size times the scalar variable being among the cells which are refined;
        resolving a fracture network within the intermediate reservoir model using the refined cells; and
        generating a reservoir earth model using the fracture network.

18. The system of claim 17, wherein:
the 2.5D-permitting fractures comprise fractures represented by one or more vertical planes; and
the other fractures comprise fractures represented by one or more horizontal planes.

19. The system of claim 17, the operations further comprising:
displaying, on the display device, the reservoir earth model.

* * * * *